United States Patent
Naidoo et al.

(10) Patent No.: US 10,365,641 B2
(45) Date of Patent: Jul. 30, 2019

(54) SYNCHRONIZATION OF CONFIGURATION CHANGES IN A PROCESS PLANT

(71) Applicant: FISHER-ROSEMOUNT SYSTEMS, INC., Round Rock, TX (US)

(72) Inventors: Julian K Naidoo, Cedar Park, TX (US); Cristopher Ian Sarmiento Uy, Metro Manila (PH); Daniel R. Strinden, Austin, TX (US); Prashant Joshi, Leicester (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 215 days.

(21) Appl. No.: 15/626,658

(22) Filed: Jun. 19, 2017

(65) Prior Publication Data
US 2018/0364686 A1 Dec. 20, 2018

(51) Int. Cl.
G05B 19/418 (2006.01)
G05B 19/042 (2006.01)

(52) U.S. Cl.
CPC ..... *G05B 19/4188* (2013.01); *G05B 19/0426* (2013.01); *G05B 2219/23255* (2013.01); *G05B 2219/25067* (2013.01); *G05B 2219/32154* (2013.01)

(58) Field of Classification Search
CPC .................................................. G06F 19/418
USPC ....................................................... 717/120
See application file for complete search history.

(56) References Cited

U.S. PATENT DOCUMENTS

| | | | | |
|---|---|---|---|---|
| 6,101,327 A | * | 8/2000 | Holte-Rost | ........ H04Q 3/54516 717/170 |
| 7,055,130 B2 | * | 5/2006 | Charisius | .................. G06F 8/20 717/108 |
| 7,146,231 B2 | | 12/2006 | Schleiss et al. | |
| 9,043,716 B2 | | 5/2015 | Jundt et al. | |
| 2013/0298237 A1 | * | 11/2013 | Smith | ................. H04L 63/0414 726/23 |
| 2014/0100669 A1 | | 4/2014 | Hammack et al. | |

* cited by examiner

*Primary Examiner* — John Q Chavis
(74) *Attorney, Agent, or Firm* — Marshall, Gerstein & Borun LLP

(57) ABSTRACT

Techniques for synchronizing configuration changes in a process plant allow for intelligent and efficient updates to objects and related dependent objects. Additionally, techniques for synchronizing minor configuration changes in a process plant enable real-time updates to objects during run-time. Such techniques reduce the amount of downtime for online operation of the process plant and reduce the amount of information transmitted over the process control network. Each object may correspond to a process entity and dependent objects may be referenced by or may reference the object. In some cases, when an engineer modifies an object, dependent objects with respect to the modified object that have pending modifications are identified and displayed to the engineer. The engineer then selects the dependent objects to sync with the modified object and the dependent objects and modified object are synced and executed by a corresponding device in the run-time system.

22 Claims, 10 Drawing Sheets

SYNCHRONIZATION OF CONFIGURATION CHANGES IN A PROCESS PLANT

FIELD OF THE DISCLOSURE

The present invention relates generally to process plants and, more particularly, to syncing related objects simultaneously for execution during run-time of a process plant or process control system.

BACKGROUND

Distributed process control systems, like those used in chemical, petroleum or other process plants, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and FOUNDATION® Fieldbus field devices. The control modules in the controller send the control signals over the communication lines to the field devices to thereby control the operation of the process plant.

Information from the field devices and the controller is usually made available over a communication network to one or more other hardware devices, such as operator workstations, personal computers, data historians, report generators, centralized databases, etc., typically placed in control rooms or other locations away from the harsher plant environment. These hardware devices run applications that may, for example, enable an operator or engineer to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management, includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Presently, configuration applications typically include a library of template objects or items, such as function block template objects and, in some cases, control module template objects. These configuration applications are used to configure a control strategy for a process plant and to provide display views at user interfaces of a process plant. The template objects all have default parameters, settings and methods associated therewith. The engineer using the configuration application can select these template objects and essentially place copies of the selected template objects into a configuration screen to develop a module, e.g., a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer may store the created module in the library or in a configuration data storage area. The engineer can then instantiate the control module (e.g., cause an executable file corresponding to the control module to be created) and download it to the appropriate controller or controllers, field devices, and other process elements for execution during operation of the process plant.

Thereafter, the engineer generally creates one or more displays for operators, maintenance personnel, etc. within the process plant by selecting and building display objects in a display creation application. These displays are typically implemented on a system wide basis in one or more of the workstations and provide preconfigured displays to the operator or maintenance persons regarding the operating state of the control system or the devices within the plant. Typically, these displays take the form of alarming displays that receive and display alarms generated by controllers or devices within the process plant, control displays indicating the operating state of the controllers and other devices being controlled within the process plant, maintenance displays indicating the functioning state of the devices within the process plant, etc. These displays are generally preconfigured to display, in known manners, information or data received from the process control modules, devices, or other process elements within the process plant. In some known systems, displays are created through the use of objects that each have a graphic associated with a physical or logical element, and that are each communicatively tied to the physical or logical element to receive data about the physical or logical element. An object may change the graphic on the display screen based on the received data to illustrate, for example, that a tank is half full, to illustrate the fluid flow measured by a flow sensor, etc.

Similar to the control configuration application, a display creation application may have template graphical display items, such as tanks, valves, sensors, operator control buttons like slide bars, on/off switches, etc. which may be placed on a screen in any desired configuration to create an operator display, maintenance display and the like. Template graphical display items may be stored in a template library along with configuration objects, or may be stored in a different template library. When placed onto the screen, individual graphic items may be interconnected on the screen in a manner that provides some information or display of the inner-workings of the process plant to different users. However, to animate the graphic display, the display creator must manually tie each of the graphical items to data generated within the process plant, such as data measured by sensors or indicative of valve positions, etc. by specifying a communication link between the graphic item and the relevant data source within the process plant. Moreover, once a display is created, it remains static in its configuration and layout.

While the control template objects within the control configuration application and the display items within the display creation application are convenient because they can be copied and used to create many different control modules and graphical displays, there is often a need to create numerous of the same control module and graphical display for different equipment and displays within the process plant. For example, many medium to large sized process plants have numerous instances of the same or similar equipment that can be controlled and viewed using the same basic general control modules and displays.

To address this problem, U.S. Pat. No. 7,043,311 (the entire disclosure of which is hereby expressly incorporated by reference herein) discloses a process plant configuration system that uses class objects also called module class objects (and generally referred to herein as class objects or classes) to enable a user to create numerous control modules, unit or equipment modules, or display modules from a common module class object. These control, equipment or display modules are created as instances of the module class or class object and include all of the features and properties of the module class object, thereby making it easier to create a number of similar control, equipment or display objects from a single or common class module object. Instances may, in turn, have their own children objects, so that objects may have multi-generational or multi-level relationships.

Currently, when an engineer makes a change to the configuration of one of the objects (e.g., the engineer changes one of the default parameters, settings or methods associated therewith, adds or deletes a parameter, etc.), the engineer saves the updated configuration of the object and downloads the updated configuration to a display application or controller to execute the updated configuration during run-time. When multiple objects are dependent on each other (e.g., when a second object references a first object or the second object is referenced by the first object), the engineer manually identifies the dependent objects and coordinates downloads for each of them to occur so that both objects are updated accordingly prior to executing the objects during the next run-time cycle. For example, when a first and second object corresponding to two devices in the process plant are dependent on each other and the configuration of one of the objects is updated, the engineer identifies and updates the configuration of the other object and then downloads the two objects simultaneously or in conjunction with each other. Then, the engineer identifies modules corresponding to the devices and downloads objects corresponding to the modules. Still further, the engineer may identify display views corresponding to the devices and modules and may download the objects corresponding to the display views. This process is tedious, time consuming and may be fraught with error.

Moreover, when an engineer makes a minor change to one of the objects, such as a change to a parameter value within the object without adding or deleting a parameter or affecting run-time logic, the engineer must save and download the entire updated configuration of the object to a display application or controller to execute the updated configuration during run-time. This may disrupt the execution of the object's run-time logic and may take up valuable bandwidth over the communication network when downloading the entire updated configuration. For example, to make the minor change, online operation may need to be stopped before the modified object is downloaded and then executed when online operation is resumed.

SUMMARY

When an engineer in a process plant modifies an object (e.g., a module class object), the engineer may request to sync the modified object to a display application, controller, field device, or other process element for execution during run-time. A synchronization system in the process plant may then identify dependent objects with respect to the modified object that also have pending modifications or configuration changes. As used herein a "dependent object" may refer to an object that refers to another object or that is referred to by another object. Additionally, the term "download" is used herein to refer to instantiation of the modified object into the on-line system for execution during run-time. The term "sync" is used herein to refer to a bi-directional update using a single operation. This includes configuration or instantiation of the modified object and run-time execution of the modified object by the on-line system. The bi-directional update is advantageous over alternative approaches where a download and an upload are performed separately to update configuration changes made locally in the on-line system without disrupting online operation.

Upon identifying dependent objects, the synchronization system presents the dependent objects to the engineer for selecting a subset of the dependent objects to sync simultaneously or in conjunction with the modified object. Then the synchronization system syncs the modified object and the selected subset of dependent objects so that the modified configurations to the object and selected subset of dependent objects may be included during execution. In this manner, the syncing is performed intelligently and efficiently.

Additionally, when the engineer makes a minor change to an object, such as a change to a parameter value within the object, the synchronization system provides the minor change to the display application, controller, field device, or other process element executing the object during run-time. The element executing the object may then overwrite the current parameter value and the next time the element accesses the corresponding parameter, the updated parameter value may be available for use. In this manner, the minor change may be updated during run-time, such that online operation is not interrupted before the minor change can be synced and included during execution. In some scenarios, the engineer may select a "sync-lite" option to perform a sync for a minor change to an object as online operation continues uninterrupted. In other scenarios, the synchronization system automatically identifies and performs the sync-lite procedure when the engineer requests to sync an object after making minor changes.

DETAILED DESCRIPTION

Figure 1:
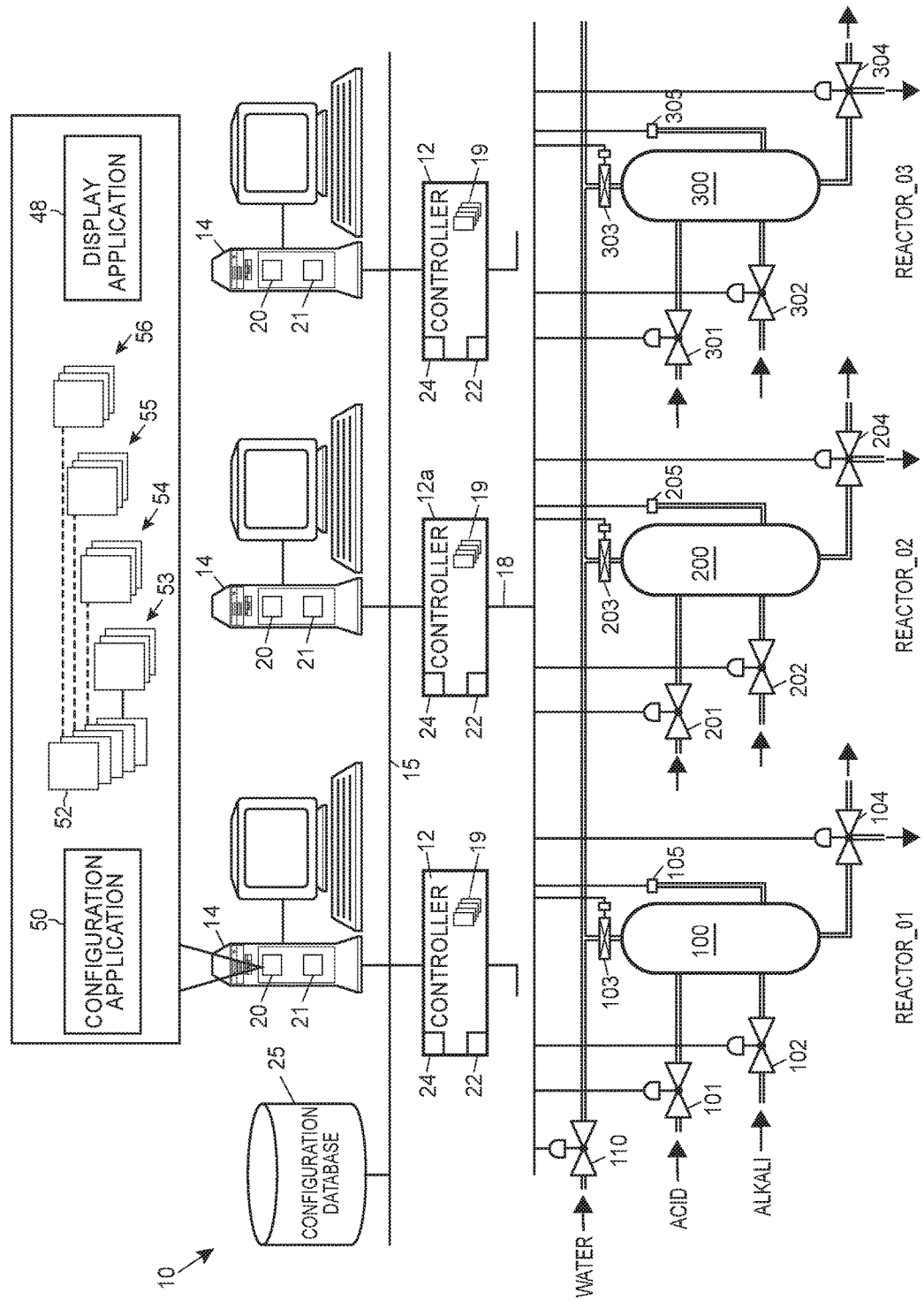
FIG. 1 is a block diagram of an example distributed process control network located within a process plant or process control system, including a workstation that implements a configuration application that uses module class objects to configure control and display activities for the process plant or process control system and a display application that displays and executes the module class objects.

Referring now to FIG. 1, a process plant 10 includes one or more process controllers 12 coupled to numerous workstations 14 via, for example, an Ethernet connection or bus 15. The controllers 12 are also coupled to devices or equipment within the process plant 10 via sets of communication lines or buses 18, with only the set of communication lines 18 connected to the controller 12a being illustrated in FIG. 1. The communication lines or buses 18 may be, for example, wired connections, wireless connections, or a combination of wired and wireless connections. The controllers 12, which may be implemented by way of example only using the DeltaV™ controller sold by Fisher-Rosemount Systems, Inc., are capable of communicating with control elements, such as field devices and function blocks within field devices distributed throughout the process plant 10 to perform one or more process control routines 19 to thereby implement desired control of the process plant 10 or of one or more processes operating in the process plant 10. The workstations 14 (which may be, for example, personal computers) may be used by one or more configuration engineers to design the process control routines 19 to be executed by the controllers 12 and display routines to be executed by the workstations 14 or other computers, and to communicate with the controllers 12 so as to sync such process control routines 19 at the controllers 12. Furthermore, the workstations 14 may execute display routines that receive and display information pertaining to the process plant 10 or elements thereof during operation of the process plant 10.

Each of the workstations 14 includes a memory 20 for storing applications, such as configuration design applications and display or viewing applications, and for storing data, such as configuration data pertaining to the configuration of the process plant 10. Each of the workstations 14 also includes a processor 21 that executes the applications to enable a configuration engineer to design process control routines and other routines and to sync these process control routines at the controllers 12 or to other computers or to collect and display information to a user during operation of the process plant 10. In some embodiments, a remote computing device is in communicative connection with the workstations 14 (e.g., via a network or web-based interface) so that a configuration engineer may execute applications remotely from the workstations 14.

Still further, each of the controllers 12 includes a memory 22 that stores control and communication applications and a processor 24 that executes the control and communication applications in any known manner. In one case, each of the controllers 12 stores and executes a controller application that implements a control strategy using a number of different, independently executed, control modules or blocks 19. The control modules 19 may each be made up of what are commonly referred to as function blocks wherein each function block is a part or a subroutine of an overall control routine and operates in conjunction with other function blocks (via communications called links) to implement process control loops within the process plant 10, e.g., to control the operation of one or more processes performed by the process plant 10.

As is well known, function blocks, which may be objects in an object oriented programming protocol, typically perform one of an input function, such as that associated with a field device such as a transmitter, a sensor or other process parameter measurement device; a control function, such as that associated with a control routine that performs PID, fuzzy logic, etc. control; or an output function which controls the operation of some device, such as a valve or other field device, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function chart, ladder logic, etc. and are not limited to being designed using function block or any other particular programming technique.

The workstations 14 may provide a graphical depiction of the process control routines 19 within the controllers 12 to a user via a display screen illustrating the control elements within the process control routines 19 and the manner in which these control elements are configured to provide control of the process plant 10. In the system of FIG. 1, a configuration database 25 is connected to the Ethernet bus 15 to store configuration data used by the controllers 12 and the workstations 14 and, in some cases, to serve as a data historian by collecting and storing data generated in the process plant 10 for future use. In an embodiment, the configuration database 25 may include library items (e.g., templates and class modules) and system configuration items (e.g., objects created from library items) corresponding to the configuration data. As such, the configuration database 25 may be logically and/or physically partitioned into a library data storage area and a system configuration storage area.

In the process plant 10 illustrated in FIG. 1, the controller 12a is communicatively connected via the bus 18 to three sets of similarly configured reactors (which are replicated equipment within the plant 10) referred to herein as Reactor_01, Reactor_02 and Reactor_03. Reactor_01 includes a reactor vessel or tank 100, three input valve systems (which are equipment entities) 101, 102 and 103 connected so as to control fluid inlet lines providing acid, alkali and water, respectively, into the reactor vessel 100 and an outlet valve system 104 connected so as to control fluid flow out of the reactor vessel 100. A sensor 105, which can be any desired type of sensor, such as a level sensor, a temperature sensor, a pressure sensor, etc., is disposed in or near the reactor vessel 100. For the purpose of this discussion, the sensor 105 is assumed to be a level sensor. Moreover, a shared header valve system 110 is connected on the water line upstream of each of the reactors Reactor_01, Reactor_02 and Reactor_03 to provide a master control for controlling the flow of water to each of those reactors.

Similarly, Reactor_02 includes a reactor vessel 200, three input valve systems 201, 202 and 203, an outlet valve system 204 and a level sensor 205 while Reactor_03 includes a reactor vessel 300, three input valve systems 301, 302 and 303, an outlet valve system 304 and a level sensor 305. In the example of FIG. 1, the reactors Reactor_01, Reactor_02 and Reactor_03 may produce salt with the input valve systems 101, 201 and 301 providing acid, the input valve systems 102, 202 and 302 providing alkali and the input valve systems 103, 203 and 303, in conjunction with the shared water header 110, providing water to the reactor vessel 100. The outlet valve systems 104, 204 and 304 may be operated to send product out of a flow line directed to the right in FIG. 1 and to drain waste or other unwanted material out of a flow line directed to the bottom in FIG. 1.

The controller 12a is communicatively coupled to the valve systems 101-104, 110, 201-204 and 301-304 and to the sensors 105, 205 and 305 via the bus 18 to control the operation of these elements to perform one or more operations with respect to the reactor units, Reactor-01, Reactor_02 and Reactor_03. Such operations, generally called phases, may include, for example, filling the reactor vessels 100, 200, 300, heating the material within the reactor vessels 100, 200, 300, dumping the reactor vessels 100, 200, 300, cleaning the reactor vessels 100, 200, 300, etc.

The valves, sensors and other equipment illustrated in FIG. 1 may be any desired kinds or types of equipment including, for example, Fieldbus devices, standard 4-20ma devices, HART devices, wireless HART devices, etc. and may communicate with the controller 12 (e.g., any of the controllers 12 or 12a) using any known or desired communication protocol such as the Fieldbus protocol, the HART protocol, a wireless HART protocol or other wireless protocol, the 4-20 ma analog protocol, etc. Generally, devices that are located within the process environment and that perform a function directly impacting the control of the process (e.g., a physical function such as opening or closing valves, a measurement function to be used in a control algorithm or loop, and/or other function) are referred to herein as "field devices."

Still further, other types of devices may be connected to and be controlled by the controllers 12 in accordance with the principles discussed herein. For example, a controller 12 may be connected to one or more input/output (I/O) devices (not shown) which, in turn, may be connected to one or more field devices. An I/O device typically is used by a controller 12 to enable communications between the one or more field devices, the controller 12, and/or the process control system. As such, the I/O device may also be a participant in the direct execution of a control algorithm or loop to control a process. Accordingly, controllers, I/O devices, and field devices are generally and categorically referred to herein as "process control devices." Of course, the term "process control device" is not limited to only controllers, I/O devices and field devices, but may also include other devices that participate in or are required for control algorithms and/or loops to be executed to control a process in a process plant or process control system.

Additionally, other numbers and types of controllers may be connected within the plant 10 to control other devices or areas associated with the process plant 10 and the operation of such additional controllers may be coordinated with the operation of the controller 12a illustrated in FIG. 1 in any desired manner. In some embodiments, the process plant 10 of FIG. 1 includes one or more nodes for wireless communications (not shown) within the process plant 10, such as access points, gateways between wireless and wired networks within the plant 10, gateways to other networks, repeaters, routers, etc. within or external to the plant 10, and the like. These nodes for wireless communications may be communicatively coupled (using a wired protocol, a wireless protocol, or a combination thereof) to controllers 12, workstations 14, the configuration database 25, field devices, other wireless-enabled nodes, and other databases or data storage devices.

Generally speaking, the process plant 10 of FIG. 1 may be used to implement batch processes in which, for example, one of the workstations 14 or the controller 12a executes a batch executive routine, which is a high level control routine that directs the operation of one or more of the reactor units (as well as other equipment) to perform a series of different steps (commonly referred to as phases) needed to produce a product, such as a particular type of salt. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12a will execute a different control algorithm for each one of these phases. Of course, the specific materials, amounts of materials, heating temperatures, times, etc. may be different for different recipes and, consequently, these parameters may change from batch run to batch run depending on the product being manufactured or produced and the recipe being used. Those skilled in the art will understand that, while control routines and configurations are described herein for batch runs in the reactors illustrated in FIG. 1, control routines may be used to control other desired devices to perform any other desired batch process runs or to perform continuous process runs, if so desired.

As will also be understood, the same phases or steps of a batch process can be implemented on each of the different reactor units of FIG. 1 at the same or at different times. Furthermore, because the reactor units of FIG. 1 generally include the same number of and types of equipment, the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more valves associated with the input valve systems 101, 102 and 103 for a certain amount of time, for example, until the level meter 105 senses that the vessel 100 is full. However, this same control routine may be used to implement a fill phase for Reactor_02 by merely changing the designation of the input valve(s) to be those associated with the valve systems 201, 202 and 203 instead of the valve systems 101, 102 and 103 and by changing the designation of the level meter to be the level meter 205 instead of the level meter 105.

To create and change a process configuration, a configuration application 50 stored in one of the workstations 14 of FIG. 1 includes a set of module class objects 52 for use in configuring the process control plant 10. The module class objects are especially useful when configuring a plant with numerous sets of replicated equipment. Generally speaking, a different module class object 52 can be created for each different type of physical unit or equipment that is replicated or used within the process plant 10, for each type of control activity that is replicated or used within the process plant 10, for each different type of display application that is replicated or used in the process plant 10, etc. Once created, the module class objects 52 can be used to configure elements of the process plant 10 that correspond to module class objects.

The module class objects 52, which are essentially generic versions of process entities and are not tied to any particular process entity, can have lower-level objects or instances 53, 54, 55 and 56 (referred to herein as module objects or module blocks) associated therewith. The term "process entity," as used herein, generally refers to a subset of the process plant 10 or environment that may be integrally identified, categorized or grouped. For example, a process entity may be a physical area of the plant, a type of equipment, a type of control function, a group of related displays, or other category. Process entities may include other process entities. For example, a process entity corresponding to "valves" may include lower level process entities such as "gas valves" or "water valves," and the lower level process entity "water valves" may include still lower level process entities such as "unidirectional water valve" and "bidirectional water valve."

As mentioned above, as used herein, module class objects generally are generic or categorical indications of process entities. A module object 53, 54, 55, 56 may be created or derived from a module class object and thus may inherit the same structure and properties as the module class object from which it was created or derived. However, each module object is tied to a particular entity within the process plant 10. Thus, a single module class object 52 may be created to represent a particular type of reactor unit (no matter how many of those reactor units are present within the plant 10), while a different module object 53 may exist or be created for each of the different reactor units of that type actually present within the plant 10.

The module objects created or derived from a module class object are associated with and owned by the module class object. As a result, changes made to the module class object can be reflected in or propagated to each of the module objects associated with that module class object. Therefore, when a number of module objects have been created from a particular module class object, with each of the different module objects tied to different process entities, each of the different module objects can be changed by simply changing the module class object and having the changes propagated down to the associated module objects. As will be discussed, the propagation may automatically occur when the module class object is changed, or the time of propagation may be selected.

The module class objects 52 of FIG. 1 may be what are commonly referred to as objects in an object oriented programming environment or language. As a result, these objects have the ability to own or to refer to other objects. Generally speaking, the module class objects 52 are high level objects which can include indications or definitions of individual elements such as control routines, equipment or other elements associated with a process entity along with a definition or indication of the manner in which those individual elements interact with one another, such as the way in which physical elements are interconnected or the way in which logical elements operate in conjunction with the physical elements. In other words, a module class object may be an object within, for example, an object oriented programming language, that provides the basis for control and viewing of a particular piece of or group of equipment, a control element, a display, etc. within the process plant 10 and may be useful for creating many instances of that element to be used to configure different replicated equipment within the process control plant 10.

Basically, each module class object is a configuration container including a generic definition of a process entity in the form of all of the different control and/or display applications or routines that are applicable to that entity to be used by the controllers 12 to control that entity or by the workstations 14 to perform display activities with respect to that entity. The module class object may represent a process entity of any nature, such as a unit, a piece of equipment, a control entity, a display application, etc. During the configuration of the process plant 10, the module class object may be used to create configuration instances of the process entity for any number of different process entities that conform to the definition provided by the module class object, with each configuration instance (the module object created from the module class object) being associated with or tied to a different actual process entity. These different module objects include, among other things, control routines and/or display routines bound to particular process entities as disposed within the process plant 10, with these control routines being able to be synced and used within the controllers 12 of FIG. 1 to perform actual control activities on the process entities and with the display routines being able to be synced at workstations 14 to perform actual display activities with respect to the entities during operation of the process plant 10.

Different types of module class objects may reflect process entities of different scopes and, therefore, contain control and/or display routines configured to operate on or with respect to process entities of different scope. The larger the scope of the process entity, such as a unit, the more control and/or display routines will typically be associated with the module class object and the easier it is to configure sections of the plant using those module class objects. However, the larger the scope of the process entity associated with a module class object, the less likely that the process will include replicated equipment at that scope and, thus, the less likely the module class object is to be useful on a large scale. Conversely, the lower the scope of the process entity associated with a module class object, the more likely the module class object is able to be used in various different locations of the plant, but the less amount of configuration is performed when using that module class object in any particular instance. In any event, the module class objects enable configuration to be performed for different replicated equipment at higher levels of abstraction than at the control module level, which makes configuring a process plant with replicated units and other equipment easier and less time consuming when using module class objects, especially module class objects of a large scope, such as at the unit level.

Consequently, multiple levels of objects are possible. For example, objects corresponding to instances 53, 54, 55, 56 created from module class objects 52 (e.g., "instance objects") may themselves be parent objects to a set of one or more instance children objects (not shown). One or more of the instance children objects may be a parent object to yet another level of children objects, and so on. As used herein, a "process element object" generally refers to a lowest level of object which corresponds to an elemental process entity to which a configuration is synced, such as a valve, sensor, graphic shape, or controller. Thus, a process element object may be an instance object that has no children objects.

In one example, when configuring a process control system, a configuration engineer may create a single module class object for the different elements replicated within the process plant, such as for the different reactors of FIG. 1. Thereafter, the configuration engineer may create instances of the module class object (module objects) for each of the actual reactors of FIG. 1. Each such created module object will include control routines used by the controller 12a to operate one of the reactors of FIG. 1 and is specifically tied to or bound to the equipment within the one of the reactors of FIG. 1. These control routines can then be synced at the controller 12a and used during operation of the process plant 10. However, once created, each of the module objects is still tied to the module class object and can be controlled by the module class object to be changed, to provide or reject access to the module object, etc.

Additionally, while the control routines may be synced at the controller 12a, the control routines and display routines may also be synced at a display application 48 stored in one of the workstations 14 of FIG. 1. The display application 48 operates or implements the display routines during run-time to create one or more process displays and may operate or implement the control routines during run-time to provide instructions to the controller 12a for controlling the field devices and to receive communications from the controller 12a. For example, the display application 48 may operate the display routine to display graphical depictions of process entities within a portion of the process plant and parameter values for parameters corresponding to the process entities. The display application 48 may also operate the control routine to provide instructions to the controller 12a for controlling the depicted process entities and for receiving the parameter values within the online process control system from the depicted process entities. The display application 48 may then display the received parameter values from the online process control system via the display routine. In other embodiments, the control routines, display routines, and/or any other suitable process routines may be synced at a combination of the controller 12a, the display application 48, the field devices, or any other process element that executes process routines during run-time.

While there are many different possible types of module class objects that can be created or used within a process plant to perform configuration activities within the process plant, four specific types discussed herein as examples include unit module class objects, equipment module class objects, control module class objects and display module class objects. Generally speaking, each different type of module class object is designed or intended for a different scope of control or use within the process plant 10. A unit module class object is intended to be used to represent (and to configure) control activities for a broad scope of equipment within a process plant. In particular, a unit module class object is intended to model or be used to configure an inter-related set of equipment (typically replicated equipment) such as, for example, the reactors of FIG. 1, having individual elements that work in concert with one another in some known manner.

An equipment module class object is intended to be used to represent (and to configure) control activities for a less broad scope of physical equipment within the process plant. The equipment associated with an equipment module class object is generally one or more physical entities, such as valves, flow meters, etc. that make up a subsystem of a unit and the equipment module class object may include one or more commands or algorithms, which may be command driven algorithms (CDAs), state driven algorithms (SDAs), sequential function chart (SFC) algorithms, function block diagram (FBD) algorithms, phase algorithms, etc., to be performed on the piece of equipment. Thus, an equipment module class object is aimed at configuring the control of multiple low level components or entities within a unit to provide a basic set of functions on that equipment as used within the unit. As is known, a command driven algorithm (command driven control logic) is used when the low level components must be coordinated through multiple steps to accomplish a function. For example, a valve may need to be opened for a particular amount of time and then closed while another valve is opened and then closed.

A control module class object is intended to be used to represent (and to configure) individual control elements or control modules within the process plant. A control module class object provides or specifies a particular type of control to be performed on a plant entity, such as a valve, meter, etc., a piece of equipment or even on a unit. Generally speaking, a control module class object provides a particular type of control programming, such as a set of communicatively interconnected function blocks defining some control module to be executed in a controller, useful to perform replicated control activities within a process plant. In most cases, a control module class object may provide a generic control strategy to manipulate a single device or a related set of devices.

A display module class object is intended to be used to represent (and to configure) display activities to be viewed by a user, such as to a control operator, during operation of the process plant 10. Thus, a display module class object may specify the programming needed to generate a display of a certain type within an operator workstation 14 of FIG. 1 and the programming needed to be run in one or more of the workstations 14 (as well as any other devices within the process plant 10) to enable that display to obtain the proper information from the plant during operation of the plant 10. Types of display class modules include, for example, alarm displays, configuration viewing displays, operation viewing displays, diagnostic displays, etc. Of course a display module class object may provide a display representing or tied to any desired scope of physical elements or entities within a process plant. For example, a display module class object may display information about an entire area, a unit, a piece of equipment, a control element, or any combination of these elements within the process plant 10.

Figure 2:
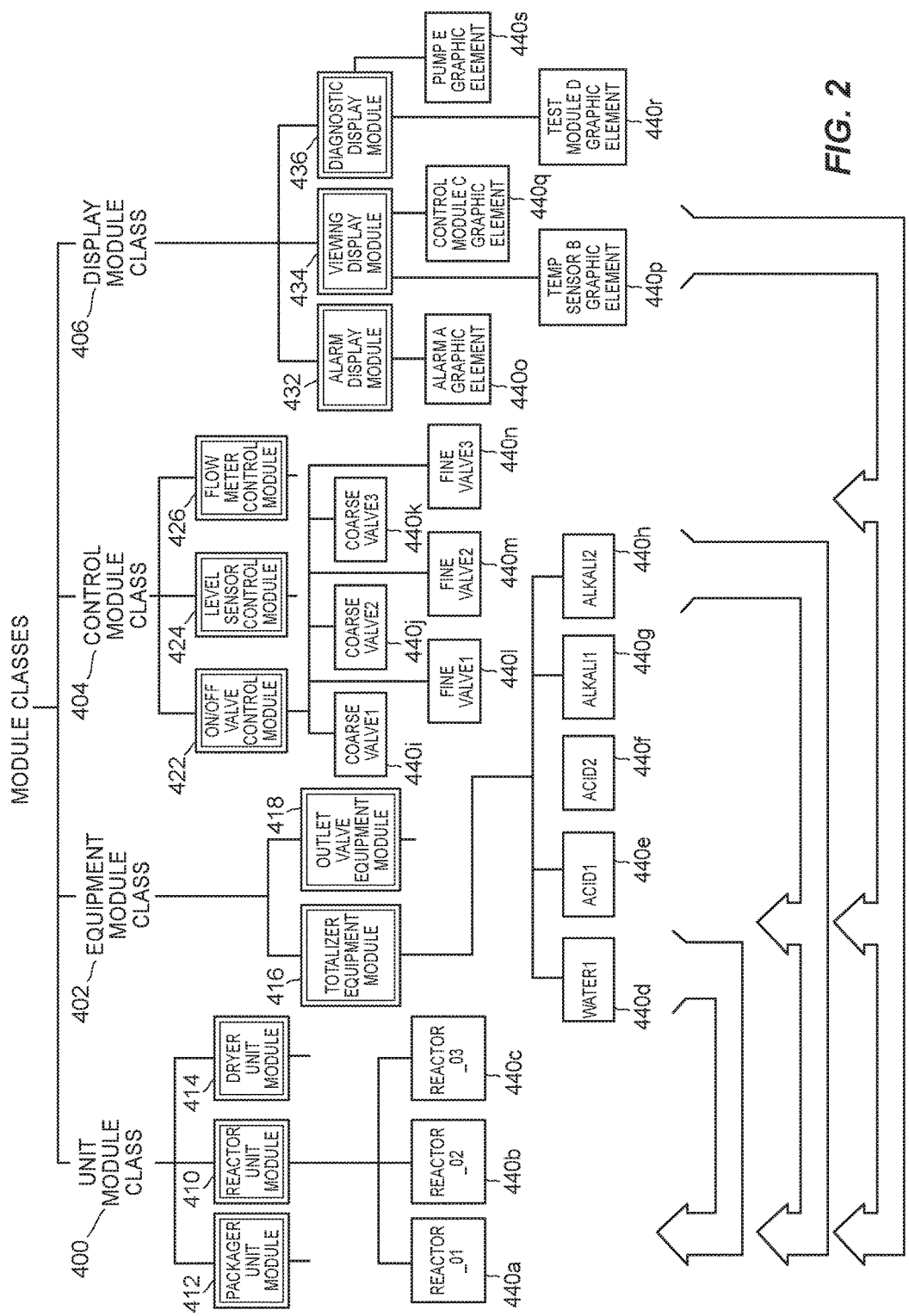
FIG. 2 is an example logical diagram illustrating the interrelationships between module class objects and associated module objects for unit, equipment, control and display types of module class objects.

Referring to FIG. 2, a hierarchical graph illustrates the interconnections between the different types of module class objects used in the configuration application 50 and executed by the display application 48 of FIG. 1 and the interrelationship between module class objects and module objects developed from those module class objects. Starting at the top of the graph of FIG. 2, module class objects (or "class objects," as interchangeably referred to herein) are separated by module class type into one of a unit module class type 400, an equipment module class type 402, a control module class type 404 and a display module class type 406. Of course, other types of module class objects may be provided or used as well, with the four types illustrated herein being merely exemplary module class types. Individual module class objects (which may be high level objects in, for example, an object oriented programming language, and are represented in FIG. 2 with a double outline for the sake of clarity) fall under each of the different types of module classes 400, 402, 404 and 406. In particular, there may be numerous different unit module class objects for different units or types of units within the process plant 10. For example, a reactor unit class module object 410 may represent a particular type or configuration of a reactor within the process plant 10. Likewise, a packager unit module class object 412 may represent a particular type or configuration of a packaging unit within the process plant 10 and a dryer unit class module object 414 may represent a particular type or configuration of a dryer unit within the process plant 10. Of course, there may be more than one reactor unit module class object to represent reactors that are different from one another in physical makeup. Further, no attempt is being made to list all of the different types of units within a plant that can be represented or modeled with a unit module class object, and one of ordinary skill in the art will realize that there are many different types of units in different types of plants that may be modeled or represented with unit module class objects.

Similarly, there may be many different equipment module class objects used to represent, model and configure different types of equipment within the process plant 10. Examples illustrated in FIG. 2 include a totalizer equipment module class object 416 and an outlet valve equipment module class object 418, each of which is associated with different types of equipment (and preferably replicated equipment) within the process plant 10. In the same manner, there may be many different types of control module class objects, illustrated in FIG. 2 as an on/off valve control module class object 422, a level sensor control module class object 424, and a flow meter control module class object 426. Moreover, display module class objects are illustrated in FIG. 2 as an alarm display module class object 432, a viewing display module class object 434 and a diagnostic display module class object 436. Of course, any other desired unit, equipment, control and display module class objects may be created and used within the configuration application 50 of the process plant 10 according to the principles described herein.

Each module class object may have sub-objects associated therewith or owned thereby. These sub-objects may be module class objects in themselves or, as illustrated in FIG. 2, may be module objects which are created as instances of the module class objects to which they belong. Such instances are interchangeably referred to herein as "module objects," "instances," "instance objects" or "module instance objects" of the module class object on which they are based or from which they are created. FIG. 2 illustrates that the reactor unit module class object 410 has three reactor module objects named Reactor_01 (reference 440*a*), Reactor_02 (reference 440*b*) and Reactor_03 (reference 440*c*) associated therewith, with these reactor module objects corresponding to (i.e., bound to) the respective reactor class object 410. FIG. 2 also illustrates the totalizer equipment module class object 416 as having or owning five different children module objects named Water1, Acid1, Acid 2, Alkali1 and Alkali2 (references 440*d*-440*h*). Likewise, the on/off valve control module class object 422 is illustrated as including children module objects named Coarse_Valve1, Coarse_Valve2, Coarse_Valve3, Fine_Valve1, Fine_Valve2 and Fine_Valve3 (references 440*i*-440*n*). Additionally, FIG. 2 illustrates the Alarm_A graphic element object 440*o* based on the alarm display module object 432, the Temp_Sensor_B graphic element 440*p* and the Control_Module_C graphic element 440*q* based on the viewing display module object 434, and the Test_Module_D graphic element 440*r* and the Pump_E graphic element 440*s* based on the diagnostic display module 436. In a similar manner, each of the other unit, equipment, control and display module class objects of FIG. 2 may have one or more module objects associated therewith. However, for the sake of simplicity, these module objects are not illustrated in FIG. 2.

In the graph of FIG. 2, each of the Reactor_01, Reactor_02, and Reactor_03 unit module objects, the Acid1, Acid2, Alkali1, Alkali2 and Water1 totalizer (equipment) module objects (references 440*a*-*h*), the Coarse_Valve1, Coarse_Valve2, Coarse_Valve3, Fine_Valve1, Fine_Valve2 and Fine_Valve3 control module objects (references 440*i*-440*n*), the Alarm_A, Temp_Sensor_B, Control_Module_C, Test_Module_D, Pump_E graphic element objects (references 440*o*-440*s*) and the other unit, equipment, control and display module objects are individual objects tied to actual process elements within the process plant 10, such as units, equipment, control modules, display applications, and graphical or graphic display elements within the process plant 10. As such, the objects 440*a*-440*s* are referred to interchangeably herein as "process element objects," "process element module objects," or "element objects." Similarly, each of the objects 440*a*-440*s* is a "child" or a "child object" of its respective "parent" or "parent object" 410-436. For example, because there are multiple physical acid totalizers used in the plant 10, there will be multiple acid totalizer process element module objects created in the configuration routine, with a separate child acid totalizer process element module object existing for each of the individual acid totalizers that exists within the plant 10. However, each of the child separate totalizer process element module objects is tied to or is owned by the same parent totalizer module class object 416. Of course, the graph of FIG. 2 illustrates only a limited number of module class objects, module objects, instance objects, and process element objects associated therewith, and it will be understood that other types of module class objects may be provided and that any desired number of module objects, instance objects, and process element objects may be created from each of the different module class objects.

Furthermore, an object that is a child of a parent object may itself have children objects. For example, the class object flow meter control module 426 may include two children instance objects, e.g., "Water_Flow_Meter module" and "Solvent_Flow_Meter module" (not illustrated). Water_Flow_Meter module may include respective children process element module objects corresponding to respective actual flow meter elements within the process plant 10, such as "Water_Flow_Meter_1" and "Water_Flow_Meter_2." As such, the process element objects "Water_Flow_Meter_1" and "Water_Flow_Meter_2" are based on "Water_Flow_Meter module," which is based on flow meter control module 426.

Each of the module class objects of FIG. 2 (and therefore each of the module objects of FIG. 2) may include, as part of the object, a definition or indication of the physical or logical process elements that define or make up the module and, if desired, the manner in which those process elements interact either physically or logically with one another to perform some activity within the process plant 10. For example, unit module class objects will typically include an indication of all of the physical and control elements within or making up the process entity being defined as the unit. The unit module class object may also define the particular makeup of the individual parts and how those parts are physically tied together to operate as a unit. Likewise, an equipment module class object will typically include the control routines or control modules to be used to control the entity defined as the piece of equipment and commands which use the control routines or control modules to define the manner in which the parts interact either physically or logically, to operate as a piece of equipment when disposed within the plant 10. Similarly, each control module class object will define a control activity, typically in the form of a control algorithm of some sort, to be performed within the plant. Also, each display module class object may define, among other things, a display screen configuration, the information to be displayed, and graphic or graphical elements representing various elements of the process plant 10 and to be presented on the display screen, as well as the data to be collected and the data manipulations to be performed on collected data, if any, for specified types of units, equipment, areas of the plant, or any other physical or logical entity within the plant 10.

As part of a module class definition, a module class object may indicate or define other module class objects to be incorporated or used therein. When this is the case, the module objects created from that module class object will incorporate, refer to or include other module objects created from other module class objects according to the relationships defined at the module class level. A module object that refers to or is referred to by another module object or a module class object is referred to herein as a "dependent object" or "dependent module object" with respect to the module object or module class object that refers to or is referred to by the module object. Additionally, a module class object that refers to or is referred to by another module class object or a module object is referred to herein as a "dependent object" or "dependent module object" with respect to the module class object or module object that refers to or is referred to by the module class object.

Although not strictly necessary, unit module class objects may incorporate other unit module class objects, equipment module class objects, control module class objects and display module class objects, while equipment module class objects may incorporate other equipment module class objects, control module class objects and display module class objects. Control module class objects may incorporate or refer to other control module class objects and display module class objects. However, if desired, other module class object interrelationships may be used as well. These incorporation relationships are illustrated by the large arrows at the bottom of the graph of FIG. 2 indicating that any of the display module class objects may be included in or referred to by any of the control, equipment and unit module class objects, that any of the control module class objects may be included in or referred to by any of the equipment and the unit module class objects and that any of the equipment module class objects may be included in or referred to by any of the unit module class objects. It will be understood that module class objects may incorporate other module class objects of the same type. For example, a unit module class object may incorporate, as part of its definition, another unit module class object. In a similar manner, an equipment module class object may include another equipment module class object, a control module class object may include another control module class object and a display module class object may include another display module class object. Of course, if desired, a module class object may use or incorporate another module class object multiple times. For example, a reactor unit module class object may incorporate or use the totalizer equipment module class object numerous times because the reactors being modeled by the reactor unit module class object include multiple instances of totalizers.

It will also be understood that, when a first module class object incorporates or uses a second module class object, any module object created from or as an instance of the first module class object will incorporate or use a module object created from or as an instance of the second module class object. Thus, when the reactor unit module class object 410 uses a totalizer module class object 416 as an element or part thereof, the Reactor_01 module object will use or include one of the totalizer module objects, such as the Acid1 module object 440*e*, as an element or part thereof. Similarly, if a totalizer equipment module class object incorporates or includes an outlet valve equipment module class object, a module object created from the totalizer equipment module class object, which will be uniquely named as, for example, Totalizer_1, will include a module object created from the outlet valve equipment module class object and uniquely named, for example, Outlet_Valve_2. In this manner, the relationships between the module class objects as defined at the module class object level are reflected in the module objects developed or created from these module class objects. This interconnection or referencing between module class objects (and therefore module objects) enables great variability and high transferability of objects during configuration activities so that, after a set of primitive module class objects, such as control and equipment module class objects, are created, more complex module class objects, such as unit module class objects, may be easily created by referencing the primitive module class objects. Of course, while module class objects can reference or use other module class objects, they can also or instead define or use simple objects or process element objects, such as valves, sensors, etc. which have no associated module class object. These simple or process element objects will be fully defined in terms of the control routines used therefor, within the module class object itself.

Figure 3:
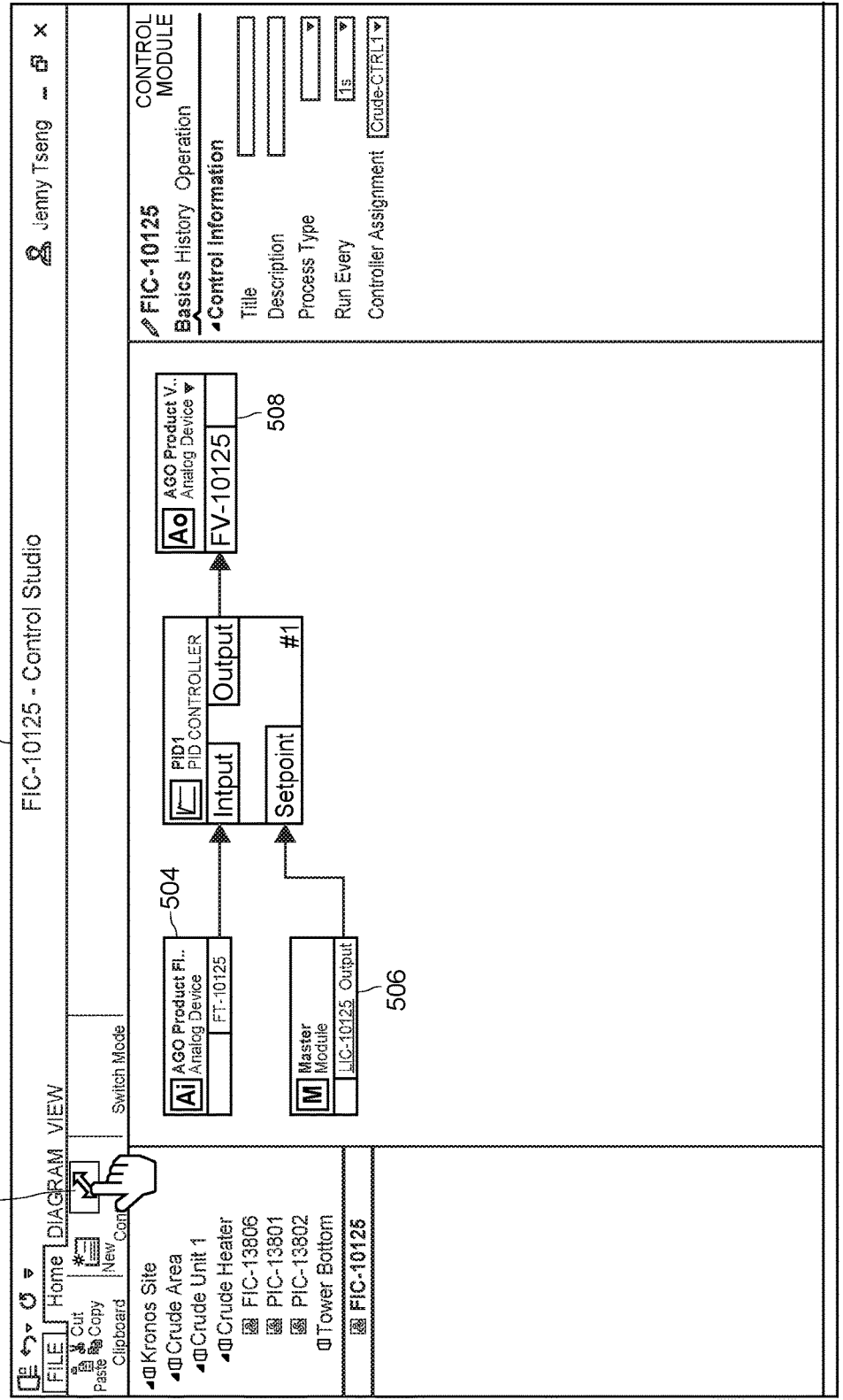
FIG. 3 is an example screen display presented by the configuration application that includes indications of module objects and a user control for syncing a module object.

When an engineer changes or modifies the configuration of an object, such as a module class object, a module object, etc. via the configuration application 50 of FIG. 1, the engineer may save the changes via the configuration application 50. The engineer may then be presented with a user control as shown in FIG. 3 to sync the modified object for execution and operation during run-time. When the engineer selects the user control, the configuration application 50 receives a request to instantiate the modified object.

FIG. 3 illustrates an example screen display 500 presented by the configuration application 50. The example screen display 500 presents a control module object FIC-10125 (reference 502) that references module objects FT-10125 (reference 504), LIC-10125 (reference 506), and FV-10125 (reference 508). Accordingly, module objects FT-10125 (reference 504), LIC-10125 (reference 506), and FV-10125 (reference 508) are dependent objects with respect to the control module object FIC-10125 (reference 502). The engineer may modify the configuration of the control module object FIC-10125 (reference 502) by adding or deleting a parameter, changing a parameter value, adding or removing a reference to another object such as one of the module objects FT-10125 (reference 504), LIC-10125 (reference 506), and FV-10125 (reference 508), changing the connections or links between the module objects FT-10125 (reference 504), LIC-10125 (reference 506), and FV-10125 (reference 508), etc. Then the user may select a user control to save the modified configuration of the control module object FIC-10125 (reference 502).

The example screen display 500 may also include a user control 510 for syncing the modified control module object FIC-10125 (reference 502). When the engineer selects the sync user control 510, the configuration application 50 instantiates the modified control module object FIC 10125 (reference 502). More specifically, the configuration application 50 syncs the modified control module object FIC-10125 (reference 502) at the controller 12a, display application 48, or other process element that executes process routines during run-time.

Additionally, upon receiving a selection of the user control 510, the configuration application 50 identifies objects, such as module class objects and module objects that reference or are referenced by the control module object FIC-10125 (reference 502) and that have pending modifications. The pending modifications to the dependent objects may be as a result of the modification to the object from which the dependent objects depend (e.g., the control module object FIC-10125 (reference 502)) or may be independent of the modifications to the control module object FIC-10125 (reference 502).

For example, the modification to the control module object FIC-10125 (reference 502) may be the addition of a reference to another module object that was not included in a previous configuration of the control module object FIC-10125 (reference 502). When a parameter is also added in module object FT-10125 (reference 504), this may be an example of a modification to the dependent object (module object FT-10125 (reference 504)) that is independent of the modification to the control module object FIC-10125 (reference 502). In another example, a unit module object for Crude Unit 1 may reference the control module object FIC-10125 (reference 502). When there is a modification to the control module object FIC-10125 (reference 502), the unit module object for Crude Unit 1 may be a dependent object with respect to the control module object FIC-10125 (reference 502) that has pending modifications as a result of modification to the control module object FIC-10125 (reference 502).

Pending modifications as used herein may refer to modifications to an object that have not yet been instantiated for execution during run-time. For example, when an engineer makes modifications to an object and/or saves the modified object but has not selected the user control 510 for syncing the modified object, then the modifications to the object remain pending.

In any event, the configuration application 50 identifies each of the dependent objects with respect to the object and may filter out those dependent objects that do not have pending modifications. The configuration application 50 may then generate and present an object selection display overlaid on the example screen display 500 with indications of the dependent objects having pending modifications. The object selection display may also include an indication of the selected object (e.g., the control module object FIC-10125 (reference 502)). In some embodiments, the object selection display includes those dependent objects that directly depend from the selected object by explicitly referencing or being referenced by the selected object (direct dependent objects). For example, module object FT-10125 (reference 504) is a direct dependent object with respect to control module object FIC-10125 (reference 502). Dependent objects that depend from the selected object by way of another dependent object (indirect dependent objects) may not be included. For example, a module object that depends from dependent module object FT-10125 (reference 504) may be an indirect dependent object with respect to control module object FIC-10125 (reference 502). In other embodiments, the object selection display includes all dependent objects that directly or indirectly depend from the selected object.

Figure 4:
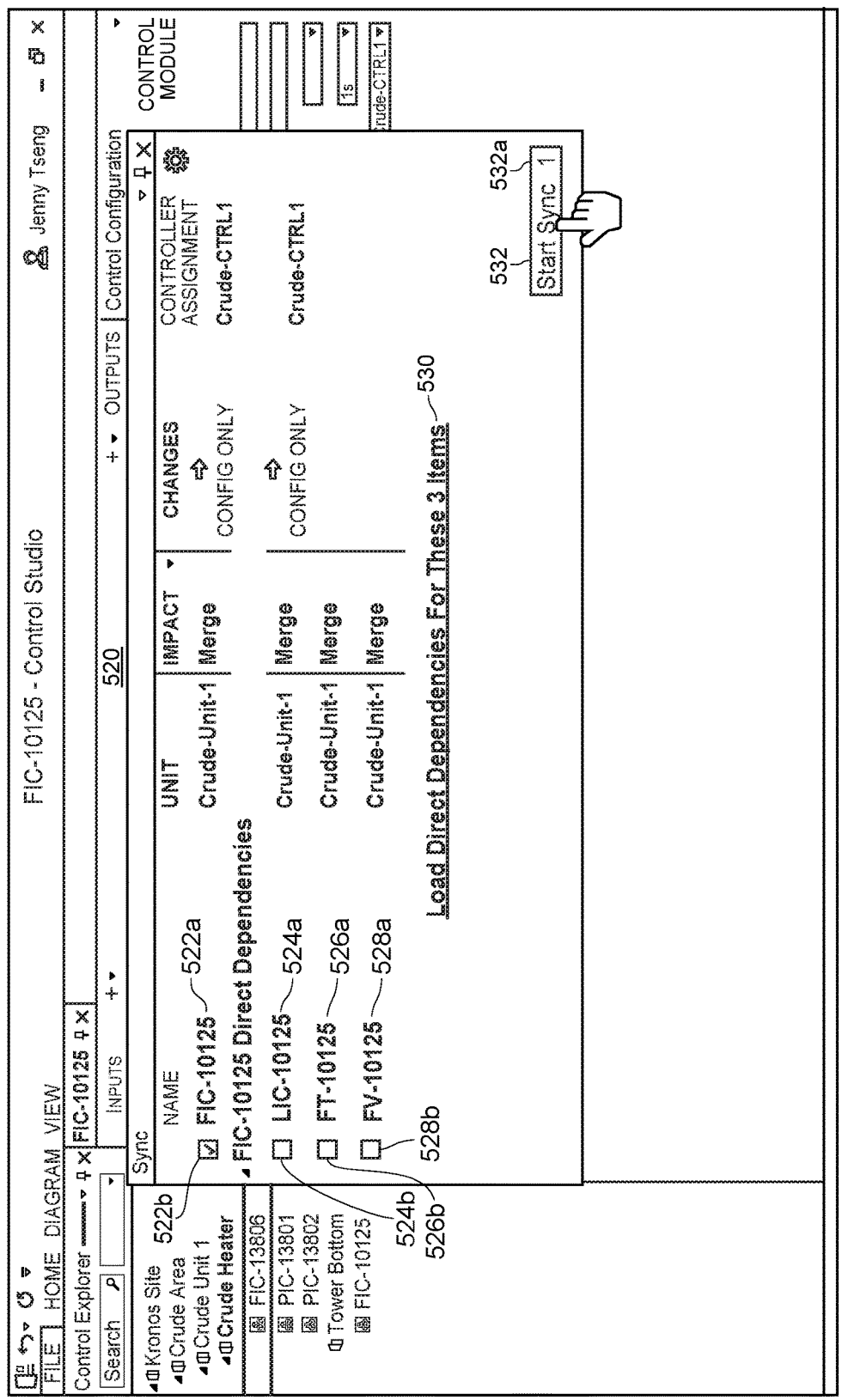
FIG. 4 is an example object selection display presented by the configuration application having user controls for selecting dependent objects to sync with the module object.

An example object selection display 520 is illustrated in FIG. 4. The object selection display 520 may be overlaid on the screen display 500 as shown in FIG. 3 when the user selects the sync user control 510. The object selection display 520 includes indications of objects 522a-528a for the engineer to sync. Each of the indications of objects 522a-528a may have a respective selection control 522b-528b which may be selected to sync the object that corresponds to the respective selection control 522b-528b. The indications 522a-528a may include the control module object FIC-10125 (reference 522a) and the direct dependent objects of the control module object FIC-10125 including module objects LIC-10125 (reference 524a), FT-10125 (reference 526a), and FV-10125 (reference 528a). The object selection display 520 may also include a user control 530 that when selected, displays indirect dependent objects for the control module object FIC-10125 that depend on dependent objects LIC-10125, FT-10125, and FV-10125. As shown in the object selection display 520, only the selection control 522b is selected corresponding to the control module object FIC-10125 (reference 522a). The other selection controls 524b-528b are unselected and accordingly, none of the direct dependent objects 524a-528a are selected to sync with the control module object FIC-10125 (reference 522a).

Upon selecting objects to sync via the selection controls 522b-528b, the engineer may select a "Start Sync" button 532 to cause instantiations of the modified objects to be generated at the process element that executes process routines during run-time. The modified objects may then be executed during run-time or during a subsequent run-time cycle when the system can update the objects to include the modified configurations. The "Start Sync" button 532 may include an indication 532a of the number of selected objects to sync. In the example object selection display 520, the engineer syncs the control module object FIC-10125 (reference 522a) and accordingly the indication 532a shows that there is 1 object to sync.

Figure 5:
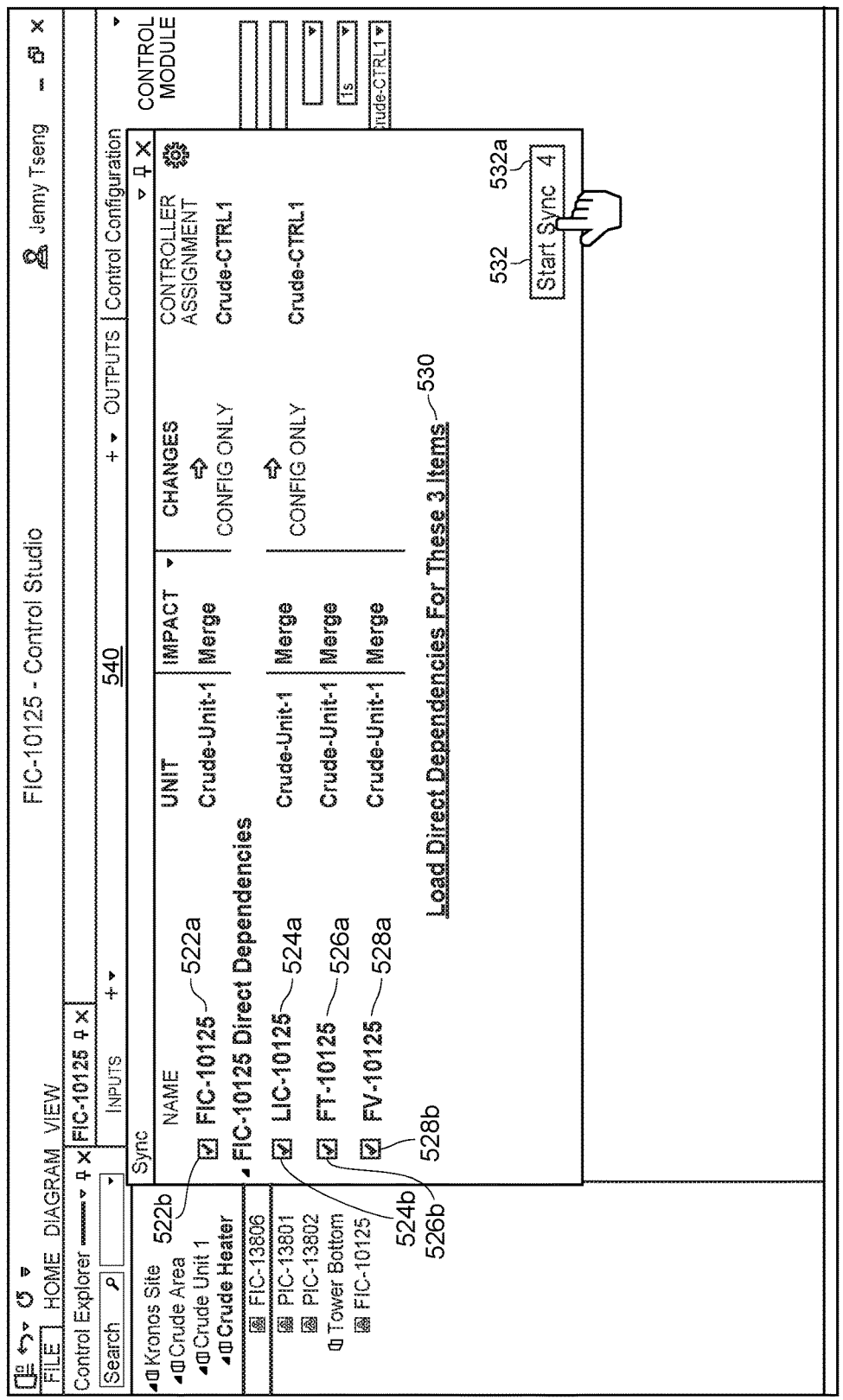
FIG. 5 is another example object selection display presented by the configuration application having user controls for selecting dependent objects to sync with the module object.

FIG. 5 illustrates another example object selection display 540 similar to the object selection display 520. In this example object selection display 540, the engineer selects all 4 objects to sync via the selection controls 522b-528b. Accordingly, the indication 532a within the "Start Sync" button 532 shows that there are 4 objects to sync.

While the examples above describe dependent objects that are module objects referenced by or that refer to another module object (e.g., the control module object FIC-10125), dependent objects may also include module class objects.

Figure 6:
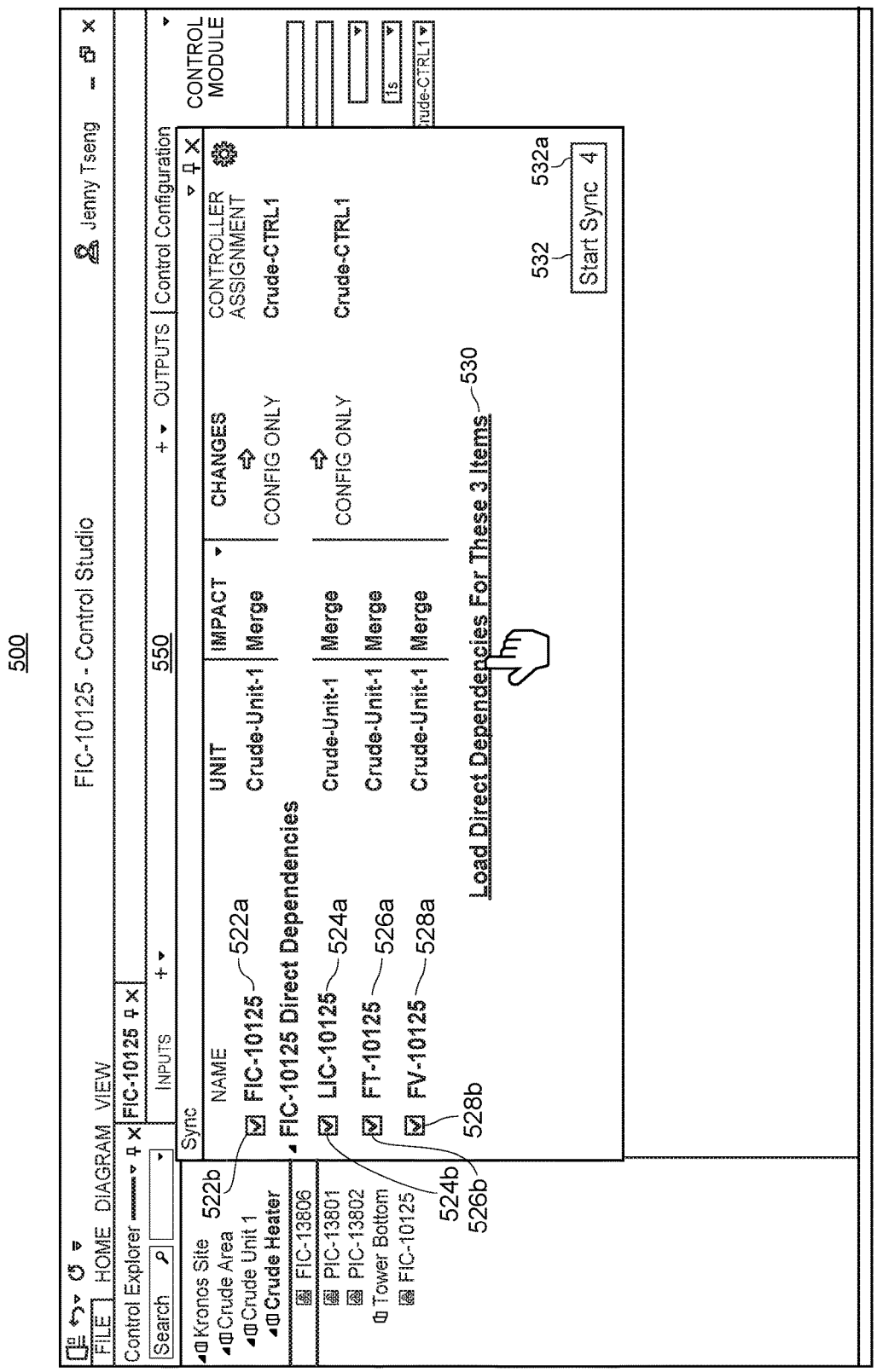
FIG. 6 is yet another example object selection display presented by the configuration application having a user control for displaying further dependent objects with respect to the dependent objects.
Figure 7:
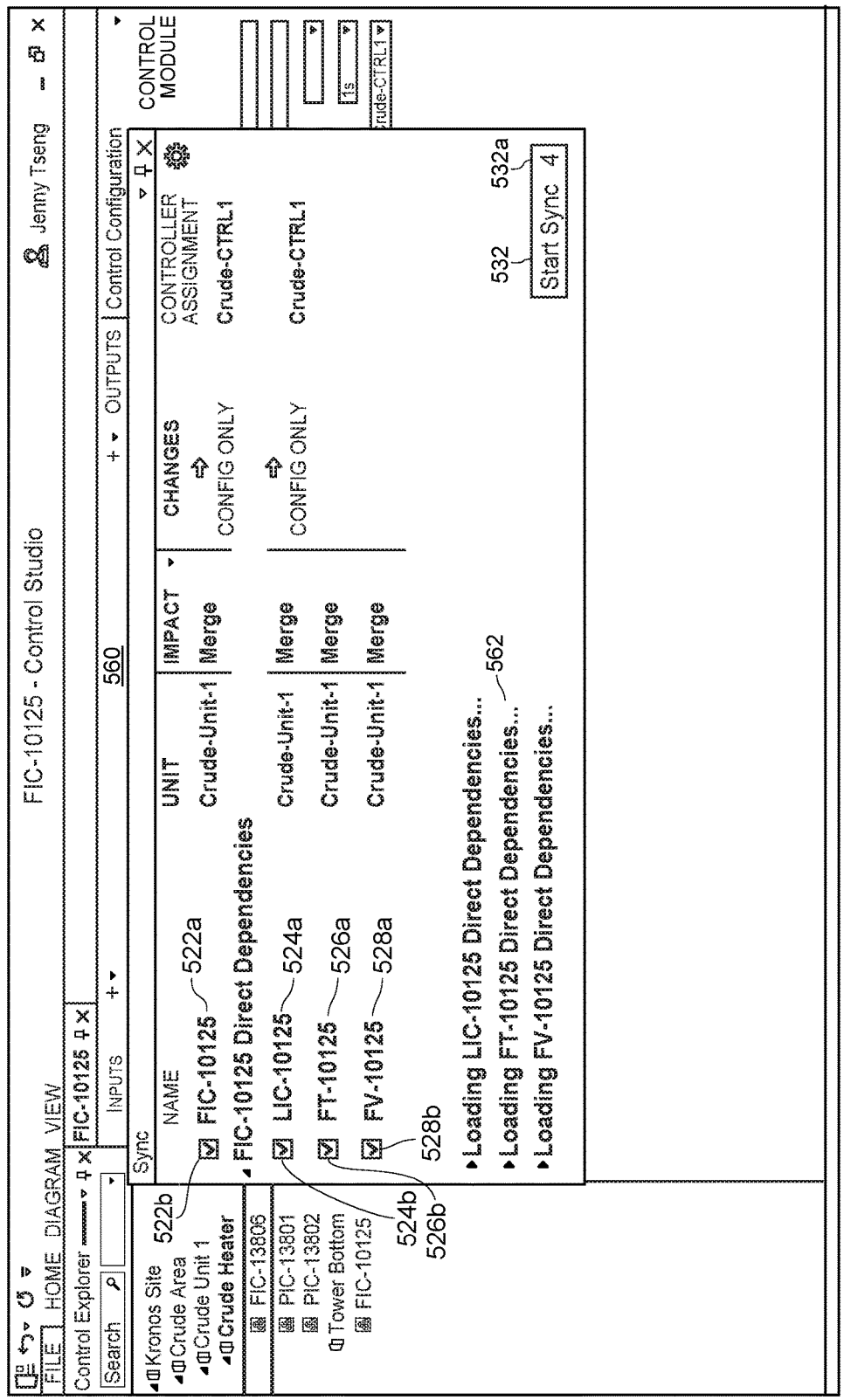
FIG. 7 is another example object selection display presented by the configuration application having user controls for selecting dependent objects to sync with the module object.
Figure 8:
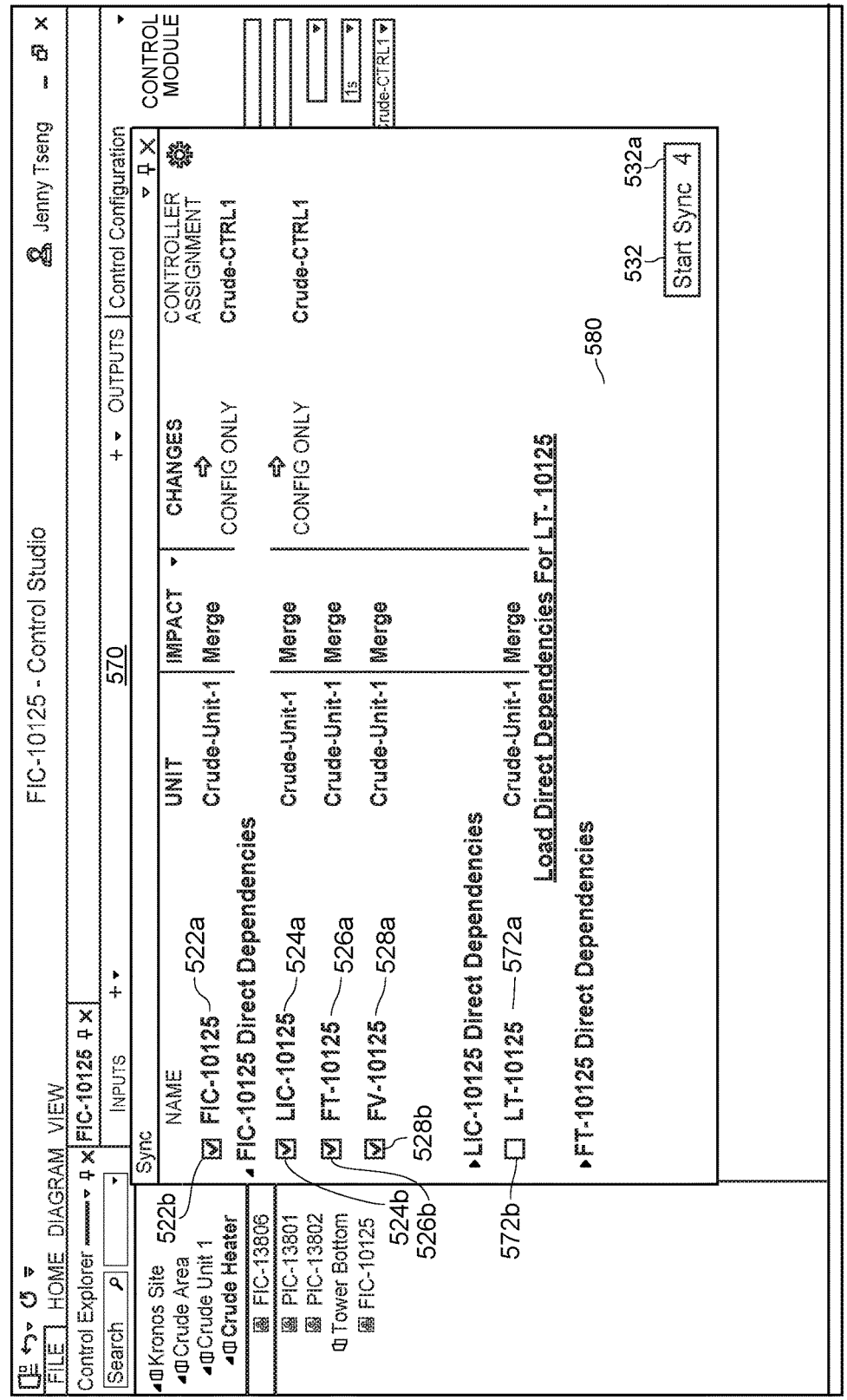
FIG. 8 is yet another example object selection display presented by the configuration application having user controls for selecting indirect dependent objects and direct dependent objects to sync with the module object.

FIGS. 6-8 illustrate an exemplary scenario where the engineer selects the user control 530 to display indirect dependent objects for the control module object FIC-10125. As shown in the example object selection display 550 of FIG. 6, the engineer selects the user control 530 via a mouse click or touch selection. In response to receiving a selection of the user control 530, the configuration application 50 identifies each of the objects that are referenced by or reference the dependent objects LIC-10125, FT-10125, and FV-10125 and that have pending modifications. FIG. 7 illustrates yet another example object selection display 560 similar to the object selection displays 520, 540, 550 as shown in FIGS. 4-6, respectively. The object selection display 560 may be presented in response to the engineer selecting the user control 530 and may include indications 562 that the configuration application 50 is loading the direct dependent objects of dependent objects LIC-10125, FT-10125, and FV-10125. These direct dependent objects may be indirect dependent objects with respect to the control module object FIC-10125.

FIG. 8 illustrates another example object selection display 570 similar to the object selection displays 520, 540, 550 as shown in FIGS. 4-6, respectively, and including indications indirect dependent objects. For example, in addition to displaying indications of control module object FIC-10125 (reference 522a) and the direct dependent objects of the control module object FIC-10125 including module objects LIC-10125 (reference 524a), FT-10125 (reference 526a), and FV-10125 (reference 528a), the example object selection display 570 includes an indication of an indirect dependent object LT-10125 (reference 572a) that depends on direct dependent object LIC-10125 (reference 524a). The object selection display 570 also includes a selection control 572b for selecting indirect dependent object LT-10125 (reference 572a) to sync with the other selected objects. Additionally, the object selection display 570 may include indications of indirect dependent objects that depend on direct dependent objects FT-10125, and FV-10125 (not shown). The object selection display 570 further includes a user control 580 that when selected, displays indirect dependent objects for the control module object FIC-10125 that depend on indirect dependent object LT-10125. Additional user controls (not shown) may also be included that when selected, display indirect dependent objects that depend on other indirect dependent objects presented in the object selection display 570.

In some embodiments, the configuration application 50 does not present direct dependent objects with respect to a dependent object that have already been included in the object selection displays 520-570. For example, under the LIC-10125 Direct Dependencies header an indication of the control module object FIC-10125 is not included since it is included above as reference 522a. However, control module object FIC-10125 is a direct dependent object of module object LIC-10125 since control module object FIC-10125 references module object LIC-10125. In this manner, indications of the same objects are not repeated throughout the object selection display 570 to avoid circular dependencies.

In any event, the engineer may select any suitable number of objects including the object, direct dependent objects, and indirect dependent objects to sync simultaneously or in conjunction with each other by selecting the "Start Sync" button 532. Then the configuration application 50 may cause instantiations of the modified objects to be generated at the process element that executes process routines during run-time. For example, the configuration application 50 may sync the modified objects at the display application 48 or the controller 12a. The modified objects may then be executed by the display application 48 or the controller 12a during run-time or during a subsequent run-time cycle when the system can update the objects to include the modified configurations.

More specifically, in some scenarios the process element that executes process routines during run-time cannot instantiate and execute modified objects without pausing execution of the current versions of the objects that affect online operation of the system. Accordingly, the process element may stop the run-time execution of the current versions of the objects to instantiate and execute the modified objects. In some embodiments, the process element stops the run-time execution of the current versions of the objects at a predetermined time, for example during a slow period of operation of the process plant 10 or during a period where the control modules, process entities, etc. corresponding to the objects are not utilized. In other embodiments, the engineer selects when to stop the run-time execution of the current versions of the objects. In any event, the process element then instantiates each of the modified objects selected by the engineer simultaneously or in the same instantiation cycle prior to resuming execution and executing the modified objects in the next run-time cycle.

In some scenarios, it may be beneficial not to pause or stop execution of the modified objects during run-time, particular when the modifications to the objects are minor. A minor modification to an object may include a change to a single parameter value (or less than a threshold number of parameter values) for a parameter within the object without adding or deleting the object's parameters. For example, for Alarm_A graphic element object 440o as shown in FIG. 2, changing an alarm limit for an alarm limit parameter may be a minor modification. Minor modifications may also include any other suitable modification that does not affect the run-time logic of the object being modified.

When the engineer saves a minor modification to an object, such as a module class object or a module object and requests to sync the minor modification (e.g., via the user control 510 as shown in FIG. 3), the configuration application 50 may identify the modifications to the object as a minor modification. Rather than syncing the entire modified object to the display application 48 or the controller 12a and pausing or stopping execution of the current version of the object during run-time before executing the modified object, the configuration application 50 provides the minor modification to the process element executing the object. The process element executing the object may then overwrite a current parameter value for the object with the updated parameter value, for example. Then the next time the process element accesses the corresponding parameter, the updated parameter value may be available for use. In this manner, the minor change may be updated during run-time, such that online operation is not interrupted before the minor change can be synced and included during execution. This reduces the amount of downtime in the run-time system as well as the amount of information transmitted over the process control network, thereby decreasing network bandwidth requirements. The process of providing a minor modification to an object to the process element executing the object without interrupting run-time execution of the current version of the object may be referred to herein as a "sync-lite procedure." In some embodiments, the configuration application 50 automatically identifies a minor modification to the object and begins the sync-lite procedure where an entire modified object is not instantiated. In other embodiments, the engineer may select a sync-lite control to begin the sync-lite procedure.

Figure 9:
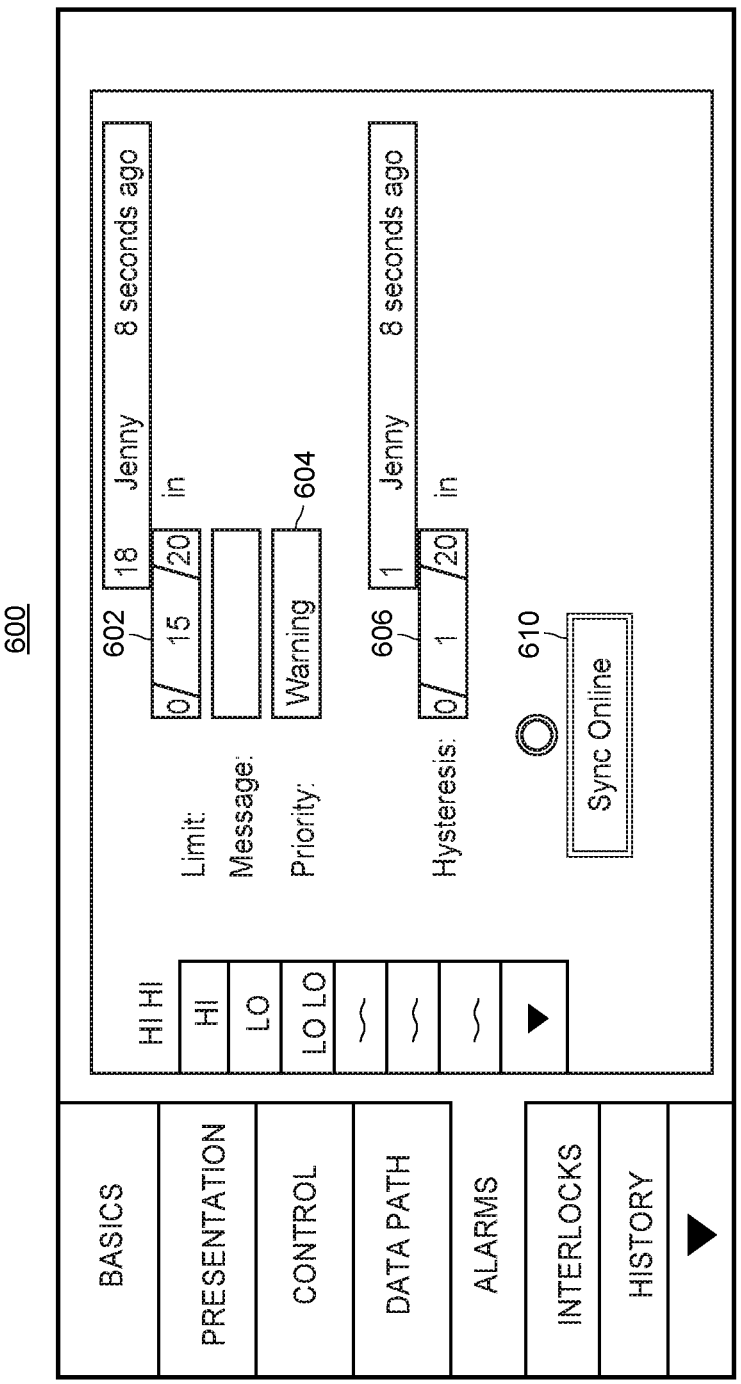
FIG. 9 is an example screen display presented by the configuration application for making minor modifications to a module object and a user control for performing a sync-lite procedure.

FIG. 9 illustrates an example screen display 600 presented by the configuration application 50 for making minor modification to an object, such as the Alarm_A graphic element object 440o as shown in FIG. 2. The screen display 600 may be a graphic representation of a faceplate for an alarm such as Alarm_A with user controls 602-606 for adjusting alarm parameter values. For example, the alarm parameter values may include an alarm limit 602, an alarm priority level 604, and an amount of hysteresis 606. The engineer may adjust each of these parameter values via the corresponding user controls 602-606 and may select a "Sync Online" button 610 to sync the modifications to the Alarm_A graphic element object 440o.

In some embodiments, the configuration application 50 analyzes the modifications to the Alarm_A graphic element object 440o to determine whether the modifications are minor. For example, the configuration application 50 may store a set of rules for determining whether modifications to an object are minor, such as a maximum threshold number of parameter values that may be modified (e.g., 3), whether a parameter has been added or deleted, whether a reference to another object has been added or deleted, whether interconnections between objects referenced by the object have modified, any suitable combination of these, or additional rules for determining whether the modifications are minor. When the configuration application 50 determines that the modifications are minor, the configuration application 50 begins the sync-lite procedure mentioned above. More specifically, the modified alarm limit 602, modified alarm priority level 604, and/or modified amount of hysteresis 606 are provided to the controller 12a, display application 48, or other process element executing the Alarm_A graphic element object 440o. The controller 12a, display application 48, or other process element then overwrites the current alarm limit with the modified alarm limit 602, the current alarm priority level with the modified alarm priority level 604, and/or the current amount of hysteresis with the modified amount of hysteresis 606 during run-time execution of the Alarm_A graphic element object 440o. Then the next time the process element detects whether the alarm limit has been executed the process element uses the modified alarm limit 602.

On the other hand, when the configuration application 50 determines that the modifications are significant or not minor, the configuration application 50 begins the full sync procedure. This involves syncing the entire modified Alarm_A graphic element object 440o at the controller 12a, display application 48, or other process element for execution during run-time or a subsequent run-time cycle when the process element can update the Alarm_A graphic element object 440o to include the modifications.

In other embodiments, the engineer determines whether the configuration application 50 will perform the full sync procedure or the sync-lite procedure. For example, the screen display 600 may include separate user controls for full sync and sync-lite, such as a "Full Sync" button and a "Sync-Lite" button (not shown). The engineer may then select the "Sync-Lite" button when the modifications to the object are minor such as a change to a parameter value.

In some embodiments, the configuration application 50 overwrites the one or several parameter values for several instances of the modified object including at dependent objects that reference the modified object. For example, a display module object may reference the Alarm_A graphic element object 440o. When the alarm limit is modified for the Alarm_A graphic element object 440o, the configuration application 50 identifies each of the dependent objects for the Alarm_A graphic element object 440o (in a similar manner as described above) and overwrites the one or several parameter values within the dependent objects that reference the Alarm_A graphic element object 440o.

In some embodiments, the configuration application 50 and/or the process element that executes the objects during run-time provides an indication of the status of the full sync or sync-lite procedure to the engineer. For example, the status may be "Sync Successful" when a parameter is overwritten or modified objects are instantiated and executed during run-time. The status may be "Pending" before the parameter has been overwritten or the modified objects instantiated.

Also in some embodiments, the sync-lite procedure is scheduled by the engineer or the configuration application 50 for a particular time. The particular time for performing the sync-lite procedure may be determined based on a current bandwidth of the process control network, an operating state of the controller 12a, display application 48, or other process element that executes the objects, etc. For example, the sync-lite procedure may be scheduled when the process control network has more than a minimum threshold amount of available network bandwidth. Then the configuration application 50 provides instructions for the controller 12, display application 48, or other process element to overwrite the one or several parameter values at the particular time.

Figure 10:
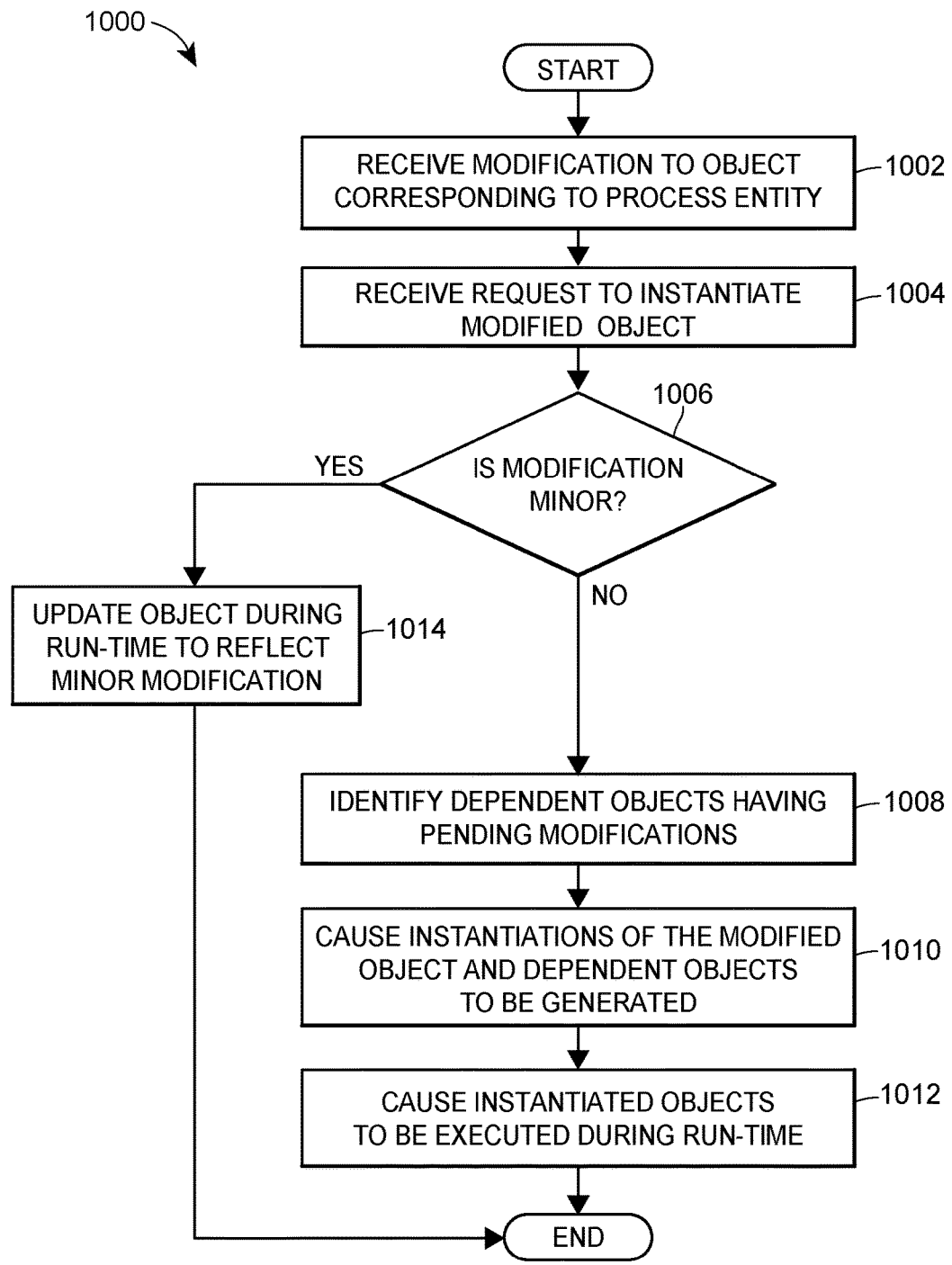
FIG. 10 is a flow diagram of an example method for syncing related objects in a process plant.

FIG. 10 depicts a flow diagram of an example method 1000 for syncing related objects in a process plant. The method 1000 may be executed on an operator workstation 14, server, or any other suitable computing device. In some embodiments, the method 1000 may be implemented in the configuration application 50 stored on a non-transitory computer-readable memory and executable on one or more processors of the operator workstation 14, server, or any other suitable computing device.

At block 1002, the configuration application 50 receives a modification by the engineer to an object (a first object) that corresponds to a process entity within the process plant. Modifications may include adding or deleting a parameter, changing a parameter value, adding or removing a reference to another object, changing connections or links between objects, etc. The configuration application 50 may also receive a request to instantiate the modified first object (block 1004). For example, the engineer may select a user control similar to the user control 510 as shown in the screen display 500 of FIG. 3 to sync the modified first object.

In some embodiments, the configuration application 50 may then determine whether the modification to the first object is minor or significant (block 1006). A minor modification to an object may include a change to a single parameter value (or less than a threshold number of parameter values) for a parameter within the object without adding or deleting the object's parameters. More generally, a minor modification may include any suitable modification that does not affect the run-time logic of the object being modified. In other embodiments, the configuration application 50 may provide separate user controls for minor modifications and for significant modifications such that the engineer may indicate whether the modification is minor. For example, the engineer may select a "Sync-Lite" button when the modification is minor and a "Full Sync" when the modification is significant or not minor. Then the configuration application 50 determines whether the modification is minor based on which user control is selected.

When the modification is minor, the configuration application 50 may provide the minor modification to the process element executing the first object (block 1014). The process element executing the first object may then overwrite a current parameter value for the first object with the updated parameter value, for example. Then the next time the process element accesses the corresponding parameter, the updated parameter value may be available for use. In this manner, the minor change may be updated during run-time, such that online operation is not interrupted before the minor change can be synced and included during execution.

On the other hand when the modification is not minor, the configuration application 50 identifies objects that reference or are referenced by the modified object and that have pending modifications (dependent second objects) (block 1008). The pending modifications to the dependent second objects may be as a result of the modification to the first object from which the dependent second objects depend or may be independent of the modifications to the first object.

In some embodiments, the configuration application 50 may generate and present an object selection display with indications of the dependent objects having pending modifications. The object selection display may include the modified object, direct dependent objects, indirect dependent objects, and selection controls for the engineer to select corresponding dependent (direct or indirect) second objects to sync with the modified first object. Upon selecting objects to sync via the selection controls, the engineer may select a "Start Sync" button to request instantiations of the modified first object and selected dependent second objects to be generated at the process element that executes process routines during run-time.

Then at block 1010, the configuration application 50 may cause instantiations of the modified first object and dependent second objects to be generated at the process element that executes process routines during run-time. The configuration application 50 may also cause the instantiated first object and dependent second objects to be executed during run-time at the process element (block 1012). For example, the configuration application 50 may sync the modified first object and dependent second objects at the process element, where the process element executes the modified first object and dependent second objects during run-time.

In some scenarios, the process element that executes process routines during run-time cannot instantiate and execute modified objects without pausing execution of the current versions of the objects that affect online operation of the system. Accordingly, the process element may stop the run-time execution of the current versions of the objects to instantiate and execute the modified objects. In some embodiments, the process element stops the run-time execution of the current versions of the objects at a predetermined time, for example during a slow period of operation of the process plant 10 or during a period where the control modules, process entities, etc. corresponding to the objects are not utilized. In other embodiments, the engineer selects when to stop the run-time execution of the current versions of the objects. In any event, the process element then instantiates each of the modified objects selected by the engineer simultaneously or in the same instantiation cycle prior to resuming execution and executing the modified objects in the next run-time cycle.

Further, the techniques, systems and methods described herein apply to items or objects stored in a library (e.g., templates and/or user-created library objects) of the process control system or plant 10. Alternatively or additionally, the techniques, systems and methods apply to items or objects stored in a configuration database 25 of the process control system or plant 10, which, in some cases, are created or are derived, at least partially, from library items or objects.

Still further, one or more of the synchronization techniques and objects described herein may be used in a process plant, such as the process plant 10 of FIG. 1, or in other suitable process plants or process control systems. In an example, one or more of the techniques described herein is performed by a configuration application 50 executed on one or more workstations 14 of FIG. 1. In another example, one or more of the techniques described herein is performed at least partially by a remote application (e.g., a web client or other remote access means) that accesses the application. In some embodiments, one or more of the synchronization techniques are used in combination with other synchronization techniques other than those described herein.

Moreover, the synchronization techniques and objects described herein are implemented using module classes such as those described in FIG. 2. The synchronization techniques described herein, however, may be implemented using other suitable module classes, software architectures, and/or programming techniques.

Item or Objects:

As previously discussed, embodiments of the synchronization techniques, systems and methods described herein enable users to make changes to library and system configuration items or objects without requiring downloads that may adversely affect the run-time process plant or process control system. Library items or objects generally are template objects stored in a centrally accessible location or library (e.g., the configuration database 25 or other storage device that is accessible to the workstations 14 and to other interfaces and computing devices). System configuration items or objects (and some library items or objects) are generally based on or derived from one or more library items. For some items and objects, at least some aspects are customized by a user.

The term "item," as used herein, refers generally to objects such as a class object, an instance object, or a process element object. An item may be stored in a library (e.g., a "library item" or "library object"), or an item may be stored in a system configuration data storage area (e.g., a "configuration item" or "configuration object"). Additionally, the term "item," as used herein, may also generally refer to an item that is internal to and defined by an object, e.g., at least part of the content of an object. Possible internal items of objects include, for example, methods, actions, data fields or other attributes, an input, an output, a type of I/O (e.g., a type of an input/output card or device via which the controller, e.g., the controller 12 or 12*a* of FIG. 1, communicates with the system), functions or usages, definitions, parameter values, a reference to a parent object, a reference to a child object, a reference to another object that is neither a parent object nor a child object, and other internal items. An internal item may be absolutely defined (e.g., a data field storing a constant value or expression), or an internal item may be relatively defined, such as by a reference to an absolute value, an absolute expression, another object, or another reference. For example, internal items defined by a graphic display element object may include a reference to a parent object, one or more fields, triggers, functions, view definitions, event handlers, animations, placeholders, parameters, tables, etc. In another example, internal items defined by a control module element object may include a reference to a parent object, one or more inputs, outputs, parameters, function blocks, interconnections, field expressions, external references, actions, algorithms, transitions, etc.

The term "current item" or "current object," as used herein, denotes an item or object which has been instantiated (and in some cases, synced), and which may executed during a run-time of a corresponding process element in the process plant 10. For example, when a current process element control object is instantiated, executable configuration code corresponding to the current process element control object is synced at a process element such as a controller 12 or 12*a* of FIG. 1, and the controller 12 or 12*a* is configured to operate, during run-time, according to the functions, inputs, outputs and other conditions as defined by the instantiated current process element control object. In another example, a current graphic display view object is instantiated at a user interface when a view corresponding to the definition included in the current graphic display view object is built and presented on the user interface. Typically, a change made to a particular internal item defined by an object typically does not affect other internal items defined by the object.

The term "modification" is used herein to denote one or more changes to the contents of an object while maintaining a link to its parent object. One example of a modification or change to a current item or object is the addition of a new internal item to the current item or object, such as the addition of a new parameter or action. Additionally or alternatively, a modification may include deleting an existing item of the current process element object, and/or may include changing a value, expression or reference of an item of defined by the object. In some scenarios, a modification includes a disabling of a particular item, so that the particular item is ignored during instantiation. For example, in a particular instance object, a user may disable an item that is defined in the parent class object. Such a capability allows a user to define instances that have less functionality than the rest of the class, but still include core class functionality. Any disabled content may be visually muted, made invisible, or otherwise rendered impotent, and is not used during run-time. Disabled content may be re-enabled by the user at any time. Generally, a modification may include resolving a reference to a constant value or expression, such as when a reference in a parent object is resolved to a constant value in a respective child object.

Any modifications, changes, and combinations thereof may be made to class items or objects, instance items or objects, process element items or objects, or internal items. In the case of instance objects and other children objects, changes or modifications to the children objects do not result in the child object being removed from its parent, in an embodiment. For example, modifications to an instance object does not remove the instance object from its class, and furthermore, does not affect other instances of the same class unless indicated as such by the user.

Instantiation:

Objects may be selected for instantiation by a user, in an embodiment. Instantiation of selected objects results in a corresponding process element executing, during run-time, according to the internal items defined by the selected objects. For example, in the case of a control object, a user desires a particular modified configuration of the control object to be synced at a corresponding device in the run-time system. The user instructs the system to generate an updated configuration from the selected configuration, and to transmit the updated configuration to the process element in the run-time system. As such, during run-time, the process element executes an executing configuration of the control object, where the executing configuration includes the modifications to the control object. In another example, a user instructs the configuration system to instantiate a graphic display element object included on a display view. The configuration system creates an executing configuration of the graphic display element object. When the corresponding display view is built at run-time, the executing configuration of the graphic display object is executed, resulting in a respective graphic element being included on the display view. When multiple configurations are available, a user may select which of the multiple configurations is to be instantiated.

Embodiments of the techniques described in the present disclosure may include any number of the following aspects, either alone or combination:

1. A computing device for synchronizing dependents object in a process plant, the computing device comprising: one or more processors; and a non-transitory computer-readable medium coupled to the one or more processors and storing a configuration application thereon, that when executed by the one or more processors, causes the computing device to: receive a modification to a first object corresponding to a first process entity; receive a request to instantiate the modified first object for operation at run-time; identify one or more dependent second objects with respect to the modified first object that have at least one pending modification, wherein the one or more dependent second objects each correspond to respective second process plant entities; cause an instantiation of the modified first object and an instantiation of at least one of the one or more dependent second objects to be generated; and cause the instantiation of the modified first object and the instantiation of the at least one dependent second object to be executed so that the first process entity and the second process entity operate at run-time according to the instantiation of the modified first object and the instantiation of the at least one dependent second object, respectively.

2. The computing device according to aspect 1, wherein the configuration application further causes the computing device to: present indications of the one or more dependent second objects to a user; receive a selection of at least one of the one or more dependent second objects from the user; and cause an instantiation of the least one dependent second object to be generated.

3. The computing device according to any one of the preceding aspects, wherein to present indications of the one or more dependent second objects to the user, the configuration application causes the computing device to: present indications of at least one of the one or more dependent second objects that are directly referenced by or directly reference the modified first object.

4. The computing device according to any one of the preceding aspects, wherein the configuration application further causes the computing device to: receive a request by the user to present dependent third objects with respect to the at least one dependent second object; and present indications of one or more dependent third objects with respect to the at least one dependent second object.

5. The computing device according to any one of the preceding aspects, wherein the configuration application further causes the computing device to: identify the one or more dependent third objects with respect to the at least one dependent second object; determine that an indication of at least one of the one or more dependent third objects with respect to the at least one dependent second object has already been presented; and not present the indication of the at least one dependent third object that has already been presented.

6. The computing device according to any one of the preceding aspects, wherein the modification to the first object includes a change to a parameter value within the first object and the configuration application further causes the computing device to: update the changed parameter value within the first object that is currently being executed during run-time prior to causing the instantiation of the modified first object to be generated and executed.

7. The computing device according to any one of the preceding aspects, wherein the configuration application further causes the computing device to: update the changed parameter value within a plurality of dependent third objects with respect to the first object.

8. The computing device according to any of any one of the preceding aspects wherein the instantiation of the modified first object and the instantiation of the at least one dependent second object are generated simultaneously.

9. A method of synchronizing dependents object in a process plant, the method comprising: receiving, by one or more processors executing a configuration application, a modification to a first object corresponding to a first process entity; receiving, by the one or more processors, a request to instantiate the modified first object for operation at run-time; identifying, by the one or more processors, one or more dependent second objects with respect to the modified first object that have at least one pending modification, wherein the one or more dependent second objects each correspond to respective second process plant entities; causing, by the one or more processors, an instantiation of the modified first object and an instantiation of at least one of the one or more dependent second objects to be generated; and causing, by the one or more processors, the instantiation of the modified first object and the instantiation of the at least one dependent second object to be executed so that the first process entity and the second process entity operate at run-time according to the instantiation of the modified first object and the instantiation of the at least one dependent second object, respectively.

10. The method according to aspect 9, further comprising: presenting, by the one or more processors, indications of the one or more dependent second objects to a user; receiving, by the one or more processors, a selection of at least one of the one or more dependent second objects from the user; and causing, by the one or more processors, an instantiation of the least one dependent second object to be generated.

11. The method according to either aspect 9 or aspect 10, wherein presenting indications of the one or more dependent second objects to the user includes: presenting, by the one or more processors, indications of at least one of the one or more dependent second objects that are directly referenced by or directly reference the modified first object.

12. The method according to any one of aspects 9-11, further comprising: receiving, by the one or more processors, a request by the user to present dependent third objects with respect to the at least one dependent second object; and presenting, by the one or more processors, indications of one or more dependent third objects with respect to the at least one dependent second object.

13. The method according to any one of aspects 9-12, further comprising: identifying, by the one or more processors, the one or more dependent third objects with respect to the at least one dependent second object; determining, by the one or more processors, that an indication of at least one of the one or more dependent third objects with respect to the at least one dependent second object has already been presented; and not presenting the indication of the at least one dependent third object that has already been presented.

14. The method according to any one of aspects 9-13, wherein the modification to the first object includes a change to a parameter value within the first object and further comprising: updating, by the one or more processors, the changed parameter value within the first object that is currently being executed during run-time prior to causing the instantiation of the modified first object to be generated and executed.

15. The method according to any one of aspects 9-14, further comprising: updating, by the one or more processors, the changed parameter value within a plurality of dependent third objects with respect to the first object.

16. The method according to any one of aspects 9-15, wherein causing the instantiation of the modified first object and the instantiation of the at least one dependent second object to be generated includes causing the instantiation of the modified first object and the instantiation of the at least one dependent second object to be generated simultaneously.

17. A method of synchronizing parameter value changes to objects in a process plant, the method comprising: executing an object corresponding to a process entity during run-time; receiving an indication of a changed value for a parameter within the object; and updating the parameter within the object with the changed value during execution of the object without disrupting run-time execution of the object.

18. The method according to aspect 17, wherein updating the parameter includes overwriting a current value for the parameter with the changed value.

19. The method according to either one of aspect 17 or of aspect 18, wherein executing an object corresponding to a process entity during run-time includes executing, by a controller, the object corresponding to the process entity during run-time.

20. The method according to any of aspects 17-19, wherein updating the parameter within the object with the changed value includes: providing the changed value for the parameter to the controller, wherein the controller overwrites a current value for the parameter with the changed value.

21. The method according to any of aspects 17-20, further comprising: automatically determining whether to update the parameter with the changed value during execution or to instantiate a modified version of the object including the changed value for the parameter, wherein the modified version of the object is executed during a subsequent runtime cycle.

22. The method according to any of aspects 17-21, further comprising: updating the parameter within a plurality of dependent objects with respect to the object with the changed value during execution of the object and the plurality of dependent objects.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1. The instructions, when executed by one or more processors of a corresponding device (e.g., a server, an operator workstation, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "engineer," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computing device for synchronizing dependents object in a process plant, the computing device comprising:
   one or more processors; and
   a non-transitory computer-readable medium coupled to the one or more processors and storing a configuration application thereon, that when executed by the one or more processors, causes the computing device to:
   receive a modification to a first object corresponding to a first process entity;
   receive a request to instantiate the modified first object for operation at run-time;
   identify one or more dependent second objects with respect to the modified first object that have at least one pending modification, wherein the one or more dependent second objects each correspond to respective second process plant entities;

cause an instantiation of the modified first object and an instantiation of at least one of the one or more dependent second objects to be generated; and cause the instantiation of the modified first object and the instantiation of the at least one dependent second object to be executed so that the first process entity and the second process entity operate at run-time according to the instantiation of the modified first object and the instantiation of the at least one dependent second object, respectively.

2. The computing device of claim 1, wherein the configuration application further causes the computing device to:

present indications of the one or more dependent second objects to a user;

receive a selection of at least one of the one or more dependent second objects from the user; and cause an instantiation of the least one dependent second object to be generated.

3. The computing device of claim 2, wherein to present indications of the one or more dependent second objects to the user, the configuration application causes the computing device to:

present indications of at least one of the one or more dependent second objects that are directly referenced by or directly reference the modified first object.

4. The computing device of claim 3, wherein the configuration application further causes the computing device to:

receive a request by the user to present dependent third objects with respect to the at least one dependent second object; and present indications of one or more dependent third objects with respect to the at least one dependent second object.

5. The computing device of claim 4, wherein the configuration application further causes the computing device to:

identify the one or more dependent third objects with respect to the at least one dependent second object;

determine that an indication of at least one of the one or more dependent third objects with respect to the at least one dependent second object has already been presented; and not present the indication of the at least one dependent third object that has already been presented.

6. The computing device of claim 1, wherein the modification to the first object includes a change to a parameter value within the first object and the configuration application further causes the computing device to:

update the changed parameter value within the first object that is currently being executed during run-time prior to causing the instantiation of the modified first object to be generated and executed.

7. The computing device of claim 6, wherein the configuration application further causes the computing device to:

update the changed parameter value within a plurality of dependent third objects with respect to the first object.

8. The computing device of claim 1, wherein the instantiation of the modified first object and the instantiation of the at least one dependent second object are generated simultaneously.

9. A method of synchronizing dependents object in a process plant, the method comprising:

receiving, by one or more processors executing a configuration application, a modification to a first object corresponding to a first process entity;

receiving, by the one or more processors, a request to instantiate the modified first object for operation at run-time;

identifying, by the one or more processors, one or more dependent second objects with respect to the modified first object that have at least one pending modification, wherein the one or more dependent second objects each correspond to respective second process plant entities;

causing, by the one or more processors, an instantiation of the modified first object and an instantiation of at least one of the one or more dependent second objects to be generated; and causing, by the one or more processors, the instantiation of the modified first object and the instantiation of the at least one dependent second object to be executed so that the first process entity and the second process entity operate at run-time according to the instantiation of the modified first object and the instantiation of the at least one dependent second object, respectively.

10. The method of claim 9, further comprising:

presenting, by the one or more processors, indications of the one or more dependent second objects to a user;

receiving, by the one or more processors, a selection of at least one of the one or more dependent second objects from the user; and causing, by the one or more processors, an instantiation of the least one dependent second object to be generated.

11. The method of claim 10, wherein presenting indications of the one or more dependent second objects to the user includes:

presenting, by the one or more processors, indications of at least one of the one or more dependent second objects that are directly referenced by or directly reference the modified first object.

12. The method of claim 11, further comprising:

receiving, by the one or more processors, a request by the user to present dependent third objects with respect to the at least one dependent second object; and presenting, by the one or more processors, indications of one or more dependent third objects with respect to the at least one dependent second object.

13. The method of claim 12, further comprising:

identifying, by the one or more processors, the one or more dependent third objects with respect to the at least one dependent second object;

determining, by the one or more processors, that an indication of at least one of the one or more dependent third objects with respect to the at least one dependent second object has already been presented; and not presenting the indication of the at least one dependent third object that has already been presented.

14. The method of claim 9, wherein the modification to the first object includes a change to a parameter value within the first object and further comprising:

updating, by the one or more processors, the changed parameter value within the first object that is currently being executed during run-time prior to causing the instantiation of the modified first object to be generated and executed.

15. The method of claim 14, further comprising:

updating, by the one or more processors, the changed parameter value within a plurality of dependent third objects with respect to the first object.

16. The method of claim 8, wherein causing the instantiation of the modified first object and the instantiation of the at least one dependent second object to be generated includes causing the instantiation of the modified first object and the instantiation of the at least one dependent second object to be generated simultaneously.

17. A method of synchronizing parameter value changes to objects in a process plant, the method comprising:
executing an object corresponding to a process entity during run-time;
receiving an indication of a changed value for a parameter within the object; and
updating the parameter within the object with the changed value during execution of the object without disrupting run-time execution of the object.

18. The method of claim 17, wherein updating the parameter includes overwriting a current value for the parameter with the changed value.

19. The method of claim 17, wherein executing an object corresponding to a process entity during run-time includes executing, by a controller, the object corresponding to the process entity during run-time.

20. The method of claim 19, wherein updating the parameter within the object with the changed value includes:
providing the changed value for the parameter to the controller, wherein the controller overwrites a current value for the parameter with the changed value.

21. The method of claim 17, further comprising:
automatically determining whether to update the parameter with the changed value during execution or to instantiate a modified version of the object including the changed value for the parameter, wherein the modified version of the object is executed during a subsequent run-time cycle.

22. The method of claim 17, further comprising:
updating the parameter within a plurality of dependent objects with respect to the object with the changed value during execution of the object and the plurality of dependent objects.

\* \* \* \* \*